United States Patent
Furuya et al.

(10) Patent No.: US 7,889,422 B2
(45) Date of Patent: Feb. 15, 2011

(54) TWO-DIMENSIONAL IMAGE DISPLAY DEVICE

(75) Inventors: Hiroyuki Furuya, Nara (JP); Tetsuro Mizushima, Osaka (JP); Kiminori Mizuuchi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 513 days.

(21) Appl. No.: 11/916,372

(22) PCT Filed: Jun. 2, 2006

(86) PCT No.: PCT/JP2006/311134

§ 371 (c)(1),
(2), (4) Date: Dec. 3, 2007

(87) PCT Pub. No.: WO2006/129809

PCT Pub. Date: Dec. 7, 2006

(65) Prior Publication Data
US 2009/0141753 A1 Jun. 4, 2009

(30) Foreign Application Priority Data
Jun. 2, 2005 (JP) .............................. 2005-162248

(51) Int. Cl.
*H01S 3/10* (2006.01)
*G02F 1/35* (2006.01)
*G02F 2/02* (2006.01)

(52) U.S. Cl. .............................. 359/326; 372/6; 372/22; 372/26

(58) Field of Classification Search ......... 359/326–332, 359/341.1, 341.3; 372/6, 21, 22, 26; 385/122
See application file for complete search history.

(56) References Cited

U.S. PATENT DOCUMENTS 5,274,651 A * 12/1993 Urakami ........................ 372/21

(Continued)

FOREIGN PATENT DOCUMENTS

EP 1 420 597 5/2004

(Continued)

OTHER PUBLICATIONS

International Search Report issued Jun. 27, 2006 in the International Application No. PCT/JP2006/311134.

(Continued)

*Primary Examiner*—Daniel Petkovsek
(74) *Attorney, Agent, or Firm*—Wenderoth, Lind & Ponack, L.L.P.

(57) ABSTRACT

A two-dimensional image display device using a Yb-doped clad pump fiber which is a rare-earth-doped fiber as a laser activation substance, whereby a peak of a fluorescence spectrum can be significantly increased as compared with a case of using an oxide crystal, and a variation width of an oscillation wavelength can be increased. Further, since the rare-earth-doped fiber is used as a fiber amplifier without providing laser mirrors at both ends thereof, control for a resonator length, which has been required in a conventional device (wherein an oxide crystal is used as a laser medium), is dispensed with, and thereby high-speed wavelength control is achieved, resulting in reduction in speckle noise when it is mounted on a two-dimensional image display device.

8 Claims, 16 Drawing Sheets

U.S. PATENT DOCUMENTS

| | | |
|---|---|---|
| 5,832,009 A | 11/1998 | Kikuchi |
| 6,367,935 B1 | 4/2002 | Wang et al. |
| 6,590,698 B1 * | 7/2003 | Ohtsuki et al. ............... 359/326 |
| 6,774,881 B2 * | 8/2004 | Karakawa ..................... 345/84 |
| 7,413,311 B2 * | 8/2008 | Govorkov et al. ............. 353/34 |
| 7,443,903 B2 * | 10/2008 | Leonardo et al. .............. 372/97 |
| 7,583,431 B2 * | 9/2009 | Furuya et al. ............... 359/326 |
| 2004/0109219 A1 | 6/2004 | Kikuchi |
| 2004/0239818 A1 | 12/2004 | Sugiyama et al. |
| 2008/0075130 A1 * | 3/2008 | Mizuuchi et al. ............... 372/6 |

FOREIGN PATENT DOCUMENTS

| | | |
|---|---|---|
| JP | 9-121069 | 5/1997 |
| JP | 9-508476 | 8/1997 |
| JP | 10-107354 | 4/1998 |
| JP | 10-294517 | 11/1998 |
| JP | 11-24169 | 1/1999 |
| JP | 2001-509911 | 7/2001 |
| JP | 2003-5714 | 1/2003 |
| JP | 2004-138669 | 5/2004 |
| JP | 2004-144794 | 5/2004 |
| JP | 2004-144936 | 5/2004 |
| JP | 2004-151133 | 5/2004 |
| JP | 2004-163817 | 6/2004 |
| JP | 2004-279943 | 10/2004 |
| WO | 95/20811 | 8/1995 |

OTHER PUBLICATIONS

International Preliminary Report on Patentability issued Apr. 11, 2007 in the International Application No. PCT/JP2006/311134.

Written Opinion of the ISA issued Jun. 21, 2006 in the International Application No. PCT/JP2006/311134.

* cited by examiner

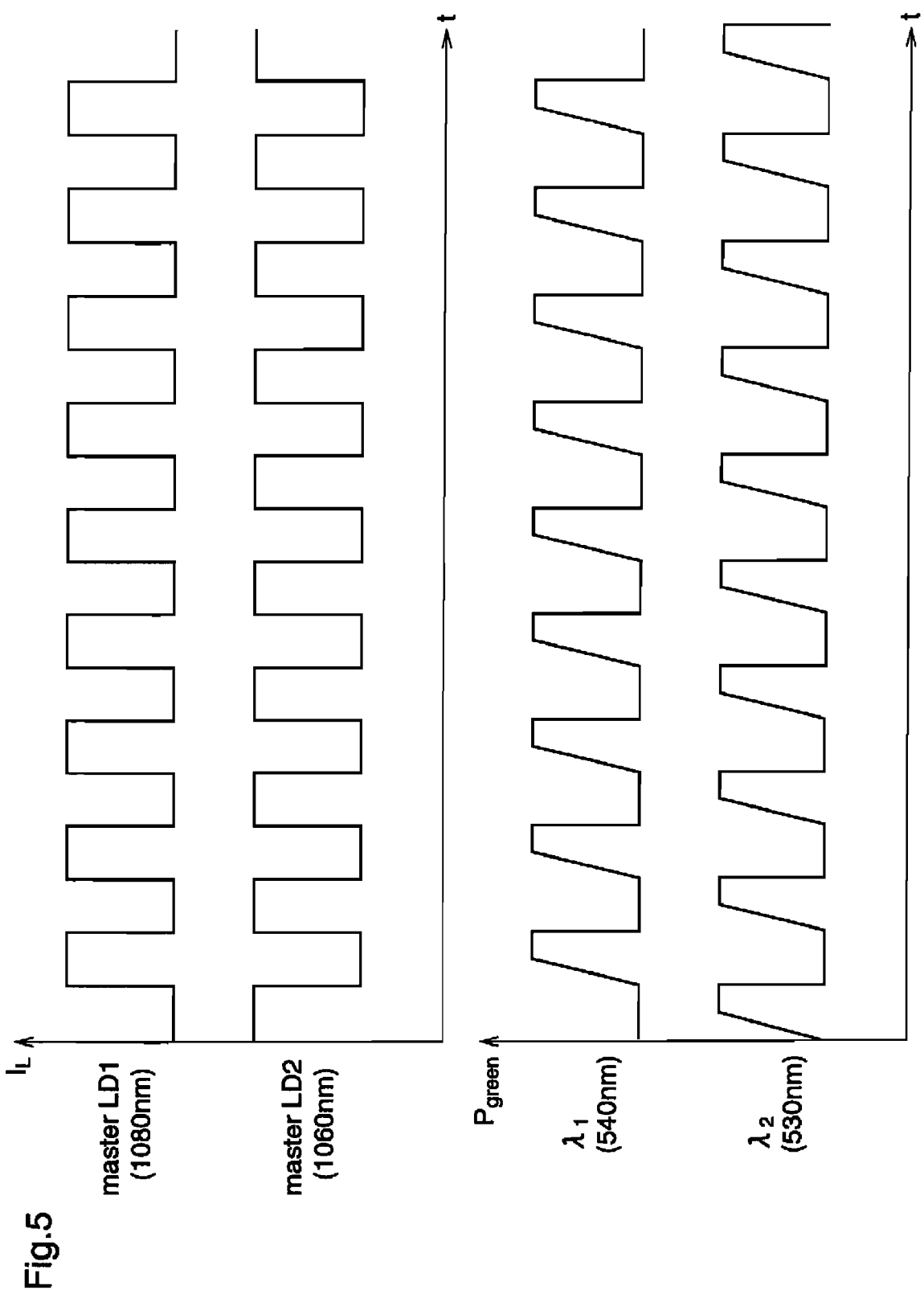

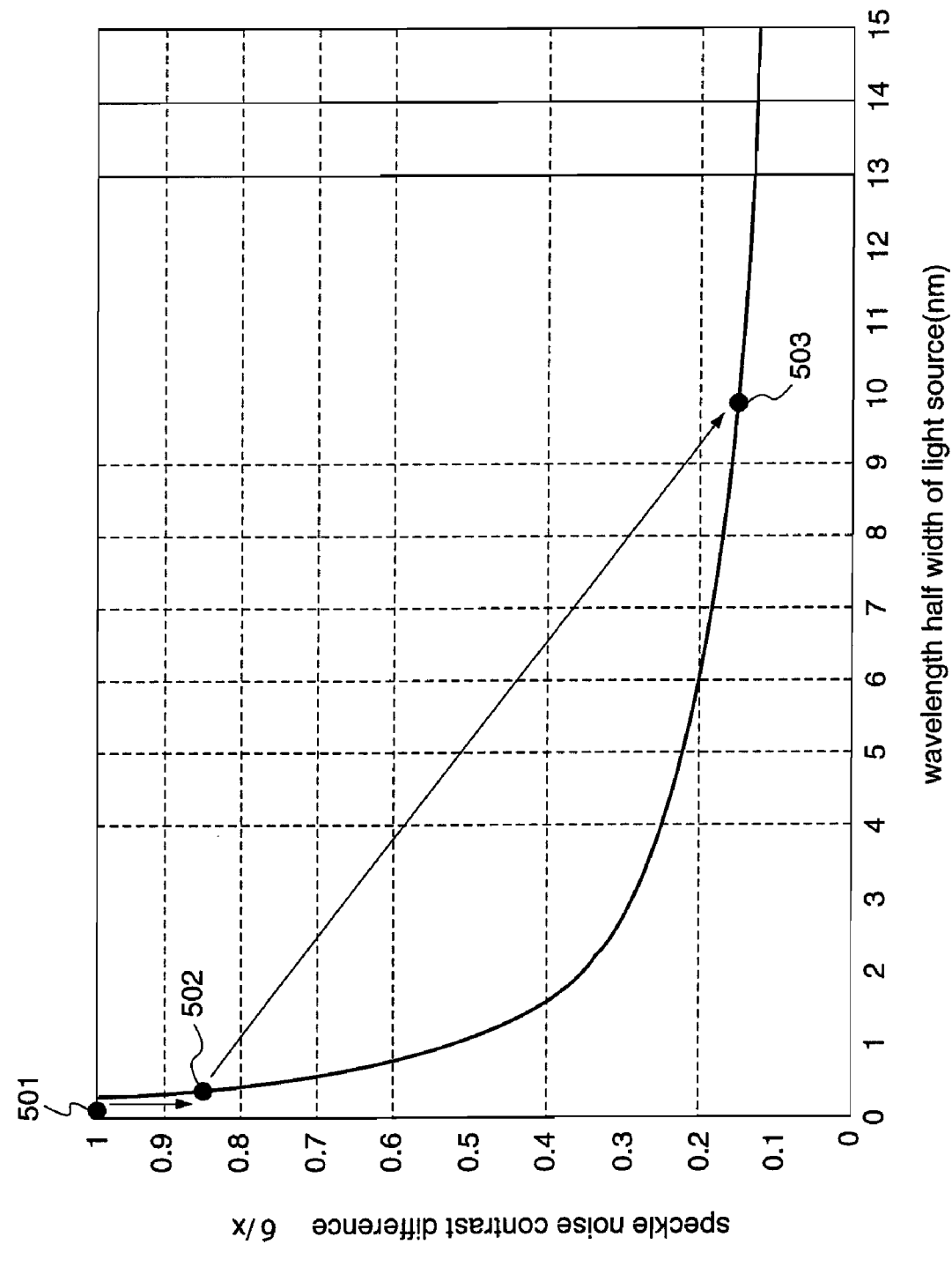

US 7,889,422 B2

TWO-DIMENSIONAL IMAGE DISPLAY DEVICE

TECHNICAL FIELD

The present invention relates to an image display device which uses a fiber laser as a light source, and has a mechanism for projecting a light beam modulated by a spatial modulator, using a projection lens.

BACKGROUND ART

In recent years, an image display device using a laser (laser display) has attracted attention for its excellent color reproducibility and low power consumption. FIG. 15 shows a schematic construction of a laser display 1200. Light beams emitted from R (red), G (green), and B (blue) laser light sources 1201 to 1203 are transmitted through a speckle removal unit comprising diffusion plates 1205a to 1205c (lenticular lens or rod prism), and intensity-converted by light modulators 1207a to 1207c according to an input video signal, and then multiplexed by a multiplexing prism (dichroic prism) 1208 comprising a dielectric multilayer mirror. Further, a two-dimensional image is displayed on a screen 1210 by a projection lens 1209. In the display thus constituted, since the respective lights from the R, G, B light sources are monochromatic lights, a vivid image having a high chromatic purity can be displayed by using laser light sources of appropriate wavelengths. Further, the light sources can be miniaturized since the laser is used, and the optical system can be miniaturized since focusing of light is facilitated, and thereby a palmtop type image display device can be realized. On the contrary, since the laser having a high coherency is used, interference noise called "speckle noise" undesirably occurs in the display image. Therefore, there have been proposed various methods for removing such speckle noise by generating an optical path difference in a polarization direction using a prism (Patent Document 1), by vibrating optical components such as two-dimensional beam scanning means 1204a to 1204c or diffusion plates 1205a to 1205c as shown in a schematic diagram of FIG. 15 to change beam paths of light sources, thereby making random the wave front of light that irradiates a screen (Patent Document 2), by generating a side band in a spectrum using a light modulator to broaden the apparent spectrum of light (Patent Document 3), by operating an oscillation wavelength using a technique of performing injection seeding into a solid laser (FIG. 16: conventional construction) (Patent Document 4), or by using semiconductor lasers of plural wavelengths which are modularized (Patent Document 5).

Patent Document 1: Japanese Published Patent Application No. 2004-151133
Patent Document 2: Japanese Published Patent Application No. 2004-138669
Patent Document 3: Japanese Published Patent Application No. Hei. 9-121069
Patent Document 4: Japanese Published Patent Application No. Hei. 10-294517
Patent Document 5: Japanese Published Patent Application No. 2004-144794

DISCLOSURE OF THE INVENTION

Problems to be Solved by the Invention

As described above, the methods for reducing speckle noise in the two-dimensional image display device using a laser light source are roughly separated into those using optical components and those using the wavelength of the laser light, and these methods have been adopted until now.

The method of modulating the optical path length or the incident direction to the screen as described in Patent Document 1 or 2 is very effective when using a semiconductor laser source having an original spectrum width that broadens about 1 nm (FWHM). However, when using a solid laser source having a narrow spectrum width, it is difficult to reduce speckle noise so as to be inconspicuous for the human eye by the solid laser source alone, and it must be combined with a method of broadening a wavelength spectrum of laser, which will be described later, and yet a complicated optical system is needed for sufficiently reducing speckle noise.

On the other hand, the above-mentioned Patent Documents 3 to 5 disclose methods for broadening the wavelength spectrum of the laser. In Patent Document 3, a light modulator, a high frequency signal source, an impedance matching circuit, and the like are required, leading to an increase in component costs, and further, a higher frequency is required when a wider spectrum width is desired. In Patent Document 5, the semiconductor laser integrated module is increased in size, and there is no other choice than using a second harmonic wave of a solid infrared laser because it is difficult to realize a semiconductor laser source of green (500 nm to 550 nm) which has the highest luminosity factor to the human eye and makes a viewer feel speckle noise. Further, as for the technique disclosed in Patent Document 4 that is close to the proposal of the present invention, in the light source shown in FIG. 16, a piezo actuator driving mirror 1311 is driven by a piezo mirror driving circuit 1310, and injection seeding is performed to a solid laser such as Nd:YAG or Nd:YVO4 to vary the oscillation wavelength. However, the fluorescence spectrum of the solid laser crystal is very sharp, and the variation width of the oscillation wavelength is small. Further, since the resonator length of the laser must be changed every time the oscillation wavelength is changed, complicated control such as subjecting the oscillation wavelength to high-speed modulation cannot be carried out.

The present invention is made to solve the above-described problems and has for its object to provide a two-dimensional image display device which can increase a variation width of an oscillation wavelength of a green light source, and reduce speckle noise in a display image.

Measures to Solve the Problems

In order to solve the above-described problems, a two-dimensional image display device of the present invention is provided with a light source comprising a double clad rare-earth-doped fiber as a laser activating substance, an excitation semiconductor laser for exciting the double clad rare-earth-doped fiber, a polarizer for changing a polarization direction to a linear direction, an SHG crystal for reducing a wavelength of laser light generated by the rare-earth-doped fiber to ½, a photodiode for monitoring an output of a second harmonic wave generated by the SHG crystal, and a plural-wavelength oscillation mechanism having a master light source provided with a wavelength variable semiconductor laser as seed light, an output controller for controlling the output of the laser on the basis of an output value obtained from the photodiode, a current source for flowing current to the master light source, and a current source for controlling the wavelength of the master light source.

Further, there is also proposed a construction wherein the plural-wavelength oscillation mechanism includes two master light sources having different wavelengths, and wavelength conversion crystals in accordance with generated fundamental waves.

Since the rare-earth-doped fiber is used as a laser activating substance in the light source, it is possible to significantly broaden a peak of a fluorescence spectrum relative to a case of using an oxide crystal such as YAG or YVO4. For example, when a Yb-doped fiber is used, it is possible to efficiently oscillate the fiber within a range of 1050~1100 nm, thereby increasing the variation width of the oscillation wavelength, compared to the conventional device.

Further, since the rare-earth-doped fiber in the light source is used as a fiber amplifier without providing laser mirrors at both ends thereof, control for a resonator length which has been required in the conventional device shown in FIG. 16 (wherein an oxide crystal is used as a laser medium) can be dispensed with, thereby realizing a high-speed wavelength control. Therefore, for example, it becomes possible to vary the oscillation wavelength for every 5000 shots at a cyclic frequency of 100 kHz.

Effects of the Invention

As described above, there is provided a two-dimensional image display device for projecting a light beam modulated by a spatial modulator, with a projection lens, using plural light sources that emit laser lights of different colors, wherein at least one of the plural light sources comprises a rare-earth-doped fiber as a laser activating substance, an excitation light source for exciting the rare-earth-doped fiber, a plural-wavelength oscillation mechanism for converting an oscillation wavelength of the laser into plural wavelengths, and oscillating the plural wavelengths alternately, and a wavelength conversion mechanism for converting the respective wavelengths of the laser lights oscillated at the plural wavelengths into shorter wavelengths. Since the rare-earth-doped fiber is used as a laser activating substance in the light source, it is possible to significantly broaden a peak of a fluorescence spectrum relative to a case of using an oxide crystal, thereby increasing the variation width of the oscillation wavelength.

Further, since the rare-earth-doped fiber is used as a fiber amplifier without providing laser mirrors at both ends thereof, control for a resonator length which has been required in the conventional device (wherein an oxide crystal is used as a laser medium) can be dispensed with, and a high-speed wavelength control is realized, whereby speckle noise in a display image can be reduced.

Further, in the two-dimensional image display device of the present invention, a master light source having, as seed lights, at least two wavelength-variable semiconductor lasers having different wavelengths is provided as the plural-wavelength oscillation mechanism. Therefore, the range of the oscillation wavelength can be further extended, whereby speckle noise in the display image can be effectively reduced.

Further, in the two-dimensional image display device of the present invention, a duty ratio of the plural oscillation wavelengths of the at least one light source is made variable. Therefore, in addition to the effect that speckle noise in the display image can be reduced, a wavelength having a high luminosity factor can be generated when brightness is required while an optimum wavelength for representing color can be generated when color representation is required.

Further, the two-dimensional image display device of the present invention is provided with a projector control circuit for changing a duty ratio between a wavelength having a high luminosity factor and a wavelength having a high color reproducibility, of the at least one light source, according to an inputted video signal. Therefore, in addition to the effect that speckle noise can be reduced, efficiency of power consumption can be enhanced by increasing a rate of using the wavelength of green light having a high luminosity factor according to video, or image quality can be enhanced by increasing a rate of using the wavelength of green light having a high color reproducibility according to video.

Further, in the two-dimensional image display device of the present invention, the at least one light source is provided with an output monitor mechanism for monitoring a light output after the wavelength conversion, and an output controller for controlling the output or wavelength of the laser on the basis of an output value from the output monitor mechanism. Therefore, it is also possible to obtain additional effects such as that the output can be stabilized by controlling the wavelength of the seed light or the temperature/stress of gratings on the basis of the power variation monitored by the output monitor.

Further, in the two-dimensional image display device of the present invention, a diffusion plate, a lenticular lens, a hologram element, or a rod prism is used as a speckle noise removal mechanism. Therefore, further reduction in speckle noise can be achieved.

BRIEF DESCRIPTION OF THE DRAWINGS

FIG. 5 is a plot diagram illustrating the relationships between time waveforms of drive current and light outputs in the light sources mounted on the two-dimensional image display device according to the second embodiment.

FIG. 7 is a plot diagram illustrating the relationship between the center wavelength difference of the green light source and the degree of speckle noise removal in the two-dimensional image display device of the present invention.

DESCRIPTION OF REFERENCE NUMERALS

Figure 1:
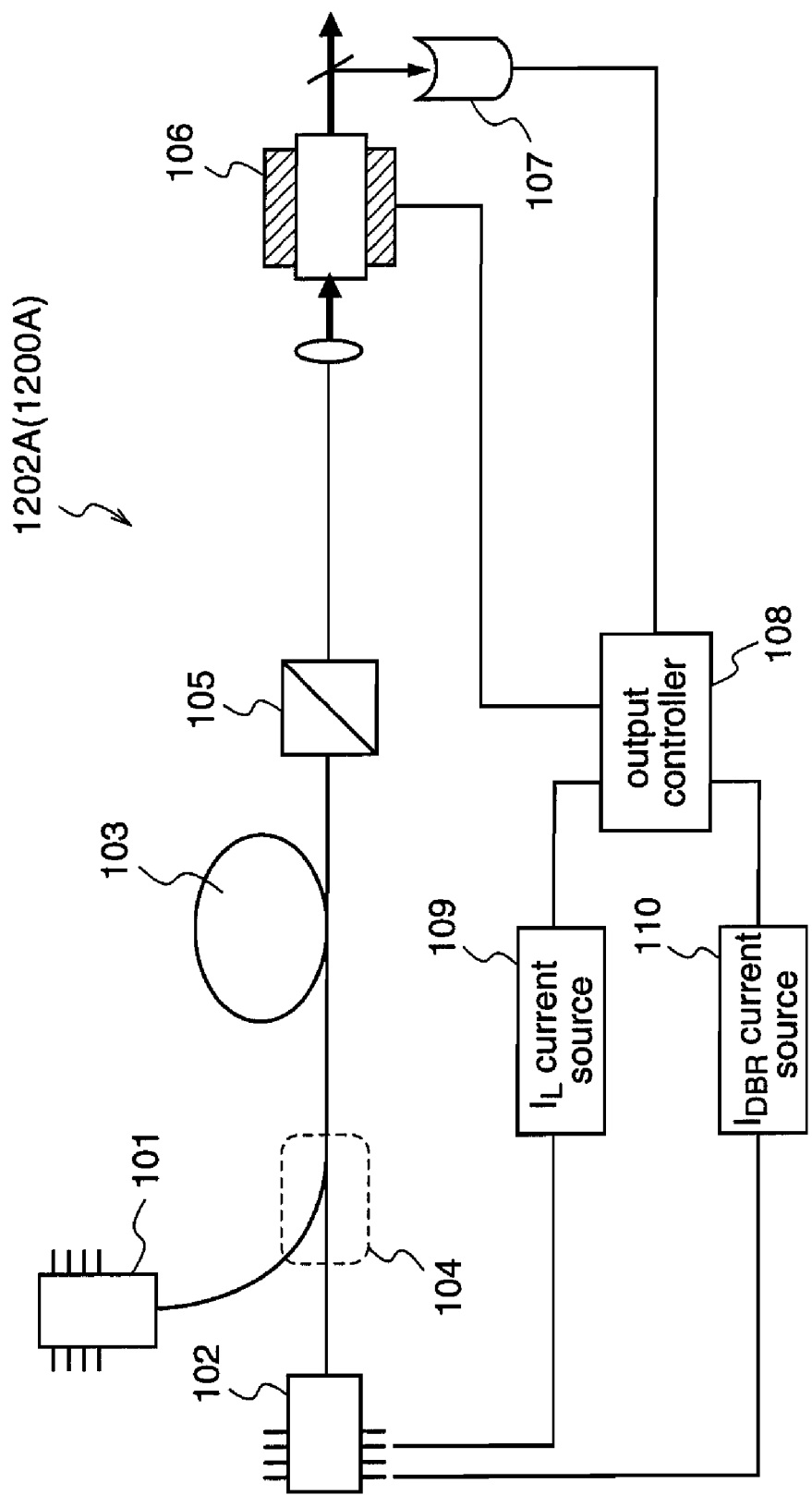
FIG. 1 is a schematic configuration diagram illustrating a green light source mounted on a two-dimensional image display device according to a first embodiment of the present invention.

101 . . . pump LD
102 . . . master light source
103 . . . Yb-doped clad pump fiber
104 . . . beam combiner
105 . . . polarizer
106 . . . SHG crystal
107 . . . PD
108 . . . output controller
109 . . . $I_L$ current source
110 . . . $I_{DBR}$ current source
201 . . . pump LD
202 . . . master light source 1
203 . . . master light source 2
204 . . . beam combiner
205 . . . Yb-doped clad pump fiber
206 . . . polarizer
207 . . . SHG crystal
208 . . . PD
209 . . . output controller
210 . . . $I_L$ current source 1
211 . . . $I_{DBR}$ current source 1
212 . . . $I_L$ current source 2
213 . . . $I_{DBR}$ current source 2
601 . . . pump LD
602a, 602b . . . fiber grating
603 . . . Yb-doped clad pump fiber
604 . . . polarizer
605 . . . SHG crystal
606 . . . PD
607 . . . output controller
608 . . . $I_{TEC}$ current source
609 . . . $I_L$ current source
610 . . . Peltier element
801 . . . pump LD
802a, 802b . . . fiber grating
803 . . . Yb-doped clad pump fiber
804 . . . polarizer
805 . . . SHG crystal
806 . . . PD
807 . . . output controller
808 . . . $I_{ACT}$ current source
809 . . . $I_L$ current source
810 . . . piezo actuator
901 . . . pump LD
902a, 902b . . . fiber grating
903 . . . Yb-doped clad pump fiber
904 . . . polarizer
905 . . . SHG crystal
906 . . . PD
907 . . . output controller
908 . . . $I_{TEC}$ current source
909 . . . $I_L$ current source
1101, 1102 . . . current waveform time
1200 (1200A~1200E) . . . portable laser display
1201 . . . red laser light source
1202 (1202A~1202D) . . . green laser light source
1203 . . . blue laser light source
1204a~1204c . . . two-dimensional beam scanning means
1205a~1205c . . . diffusion plate
1206a~1206c . . . field lens
1207a~1207c . . . spatial light modulator
1208 . . . dichroic prism
1209 . . . projection lens
1210 . . . screen
1301 . . . pump LD
1302 . . . seed light LD
1303 . . . laser crystal
1304 . . . polarization control mechanism
1305 . . . SHG crystal
1306 . . . PD
1307 . . . crystal temperature controller ($I_{TEC}$ current source)
1308 . . . output controller
1309 . . . $I_L$ current source
1310 . . . piezo mirror driving circuit
1311 . . . piezo actuator driving mirror
1501 . . . projector control circuit
1502 . . . wavelength determination circuit
1503 . . . luminance signal judgment circuit
1504 . . . video mode selection switch
1505 . . . video signal (data)
1506 . . . video signal (video)
1507 . . . wavelength selection signal line

DETAILED DESCRIPTION OF THE INVENTION

Hereinafter, embodiments of the present invention will be described with reference to the drawings.

Embodiment 1

Figure 15:
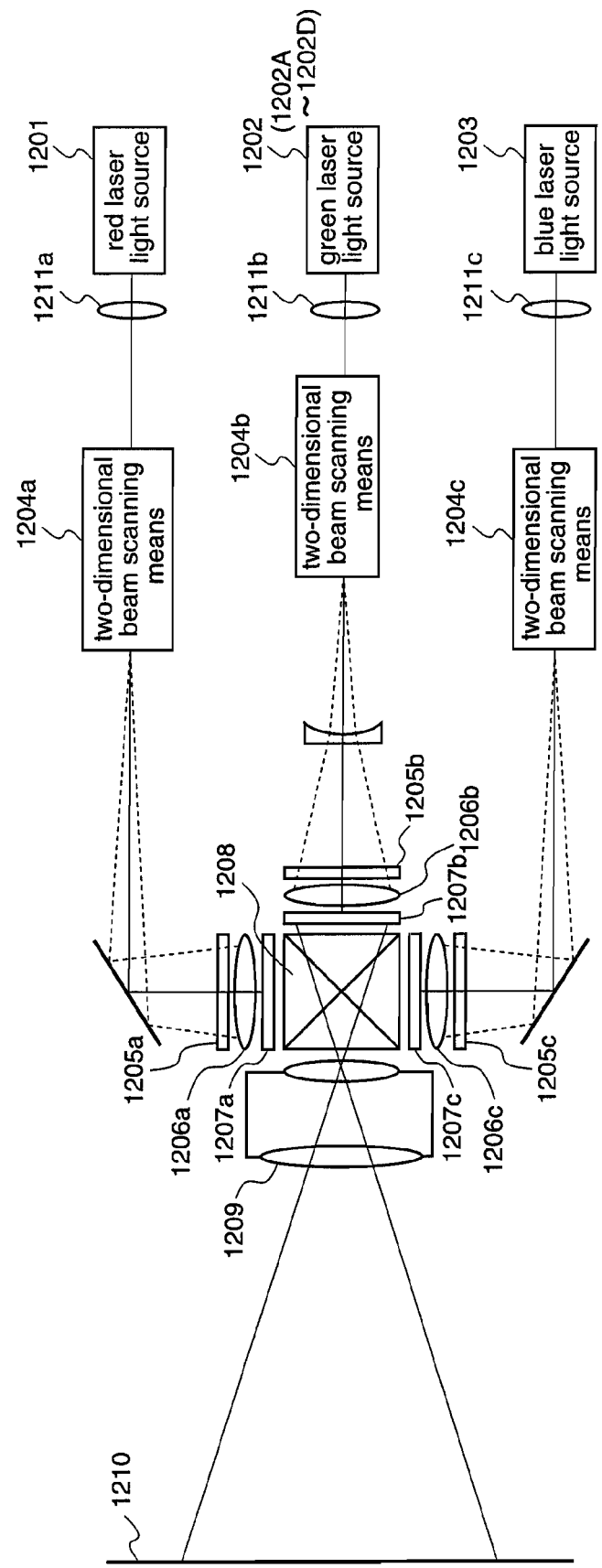
FIG. 15 is a schematic configuration diagram for explaining the two-dimensional image display device according to the first to fourth embodiments and the prior art.
Figure 16:
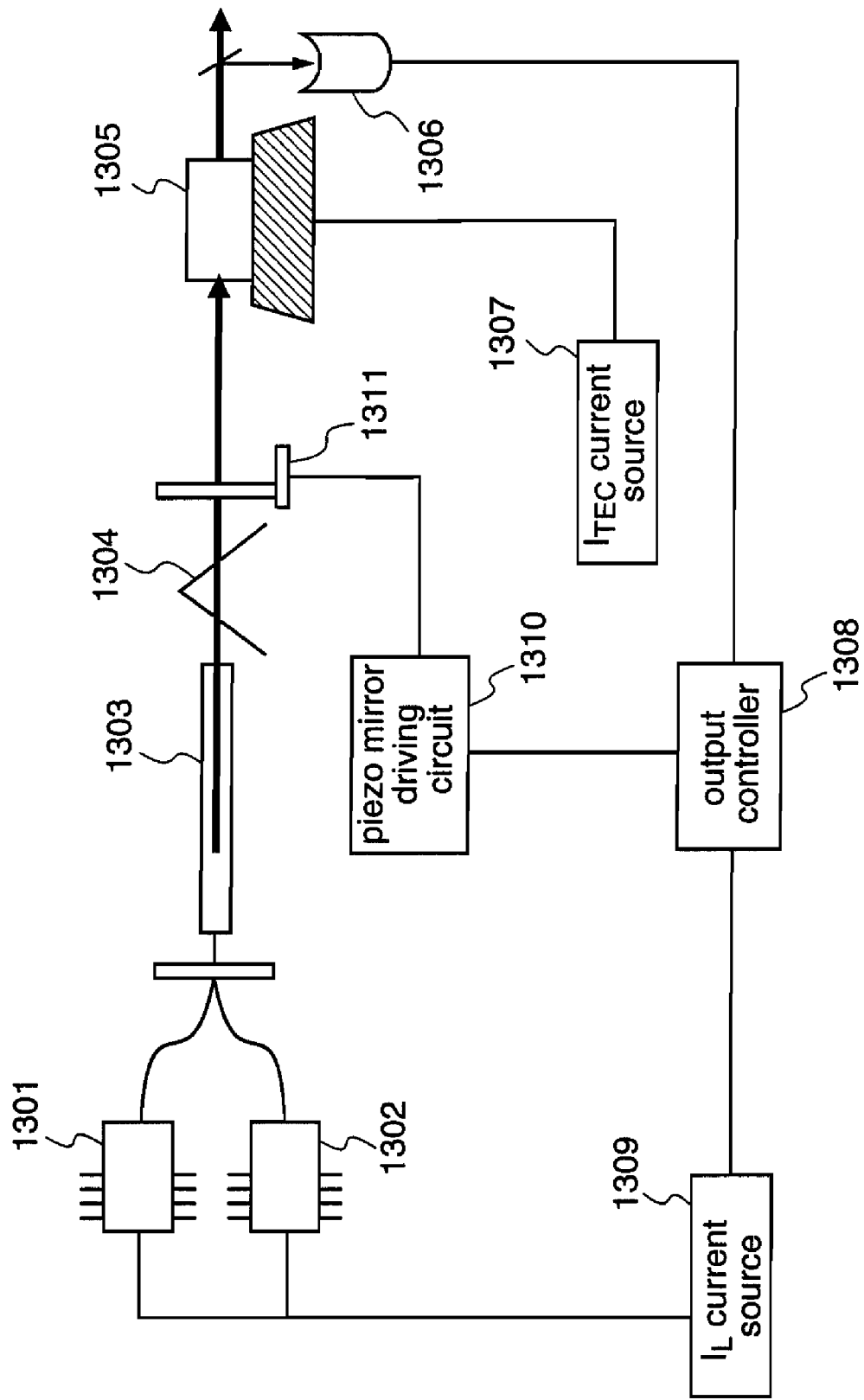
FIG. 16 is a diagram illustrating an example of a light source used in the conventional two-dimensional image display device.

A two-dimensional image display device according to a first embodiment of the present invention is constituted as shown in FIG. 15, and it has a feature in a green light source.

Hereinafter, a two-dimensional image display device 1200A according to the first embodiment will be described with reference to FIGS. 1, 2, and 15.

With reference to FIG. 15, a portable laser display (two-dimensional image display device) 1200A according to the first embodiment adopts red (R), green (G), blue (B) laser light sources 1201 to 1203. A GaAs series semiconductor laser having a wavelength of 638 nm is used as the red light source 1201, a GaN series semiconductor laser having a wavelength of 465 nm is used as the blue light source 1203, and a wavelength-conversion green light source that is provided with a wavelength conversion mechanism for reducing a wavelength of an infrared laser to ½ is used as the green light source 1202A. Further, while in FIG. 15 one semiconductor laser is used for each of the red light source 1201 and the blue light source 1203, each light source may be constituted such that outputs from 2 to 8 semiconductor lasers can be obtained as a single fiber output by using a band fiber. In this case, the wavelength spectrum widths of the red light source 1201 and the blue light source 1203 become as broad as several nanometers, and the respective light sources can suppress occurrence of speckle noise by these broad spectrums.

Next, a description will be given of the construction of the green light source 1202A in the two-dimensional image display device 1200A according to the first embodiment, with reference to FIG. 1.

FIG. 1 is a schematic configuration diagram of the green light source 1202A in the two-dimensional image display device 1200A of the first embodiment.

With reference to FIG. 1, the green light source 1202A uses a Yb-doped clad pump fiber 103 (rare-earth-doped fiber) as a laser medium, a laser diode as a pump laser 101, and a DBR (Distributed Bragg Reflector) laser diode as a master light source 102. Further, the green light source 1202A comprises a polarizer 105 for linearly polarizing oscillated light, a SHG crystal 106 for generating a second harmonic wave of the oscillated light, a photodiode (PD) 107 for monitoring the output of the SHG crystal 106, an output controller 108 for controlling the wavelength of the master light source 102 and the temperature of the SHG crystal, and making an output constant on the basis of the second harmonic wave output that is detected by the PD 107, and control current sources ($I_L$ current source 109, $I_{DBR}$ current source 110) for receiving a control signal from the output controller 108, and controlling the wavelength and output of the master light source.

Figure 2A:
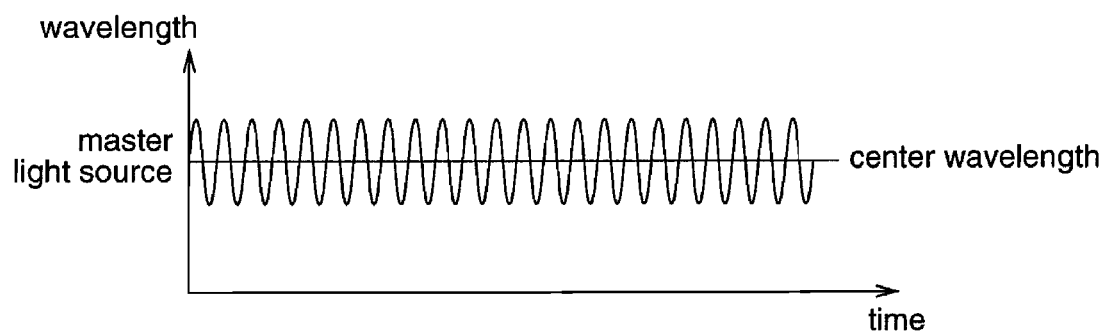
FIGS. 2(a) and (b) are diagrams illustrating a wavelength amplitude of a master light source in the green light source mounted on the two-dimensional image display device according to the first embodiment.

The Yb-doped clad pump fiber 103 is excited by a pump LD 101 (wavelength=about 915 nm, maximum output=30 w). The master light source 102 is a light source for introducing seed light for determining an oscillation wavelength. In this first embodiment, a DBR laser is used as a wavelength variable semiconductor laser, and the wavelength of the master light source 102 can be controlled around 1060 nm. The polarizer 105 is inserted to linearly polarize the oscillated fundamental wave. The oscillated light (wavelength=about 1060 nm) is incident on the SHG crystal 106 comprising a non-linear optical crystal (in this first embodiment, periodically poled MgO:LiNO3 crystal having a length of 10 mm), and it is converted into green light having a ½ wavelength, i.e., 530 nm. A portion of the generated green light is separated by a splitter to be input to the PD 107. This PD 107 measures the intensity of the green light. The measured light intensity is converted by the output controller 108, thereby controlling the output current and oscillation wavelength of the master light source. On the other hand, if the output stabilization by the master light source is not performed, the wavelength can be stabilized by controlling the temperature of the SHG crystal. The output controller 108 keeps the SHG crystal 106 at a constant temperature and controls the $I_L$ current source 109 and the $I_{DBR}$ current source 110, thereby to modulate the wavelength of the master light source 102 at a constant frequency. FIG. 2(a) shows examples of variations in the wavelength of the master light source. As shown in FIG. 2, the output controller 108 controls the master light source so as to vary the oscillation wavelength at a constant frequency about several MHz.

Furthermore, the SHG crystal is generally temperature-controlled with a precision of 0.01° C. because a phase-matched wavelength thereof varies depending on the temperature, and it is controlled at a constant temperature so that the phase-matched wavelength becomes 1060 nm. The precision of the temperature control may be lowered, and in this case, a cost reduction can be achieved although the phase-matched wavelength varies according to the temperature change.

As described above, in the green light source 1202A in the two-dimensional image display device 1200A of the first embodiment, a plural-wavelength oscillation mechanism is constituted by the master light source 102, the output controller 108, the $I_L$ current source 109, and the $I_{DBR}$ current source 110 to convert the oscillation wavelength of the laser into plural wavelengths.

Next, the operation of the two-dimensional image display device 1200A according to the first embodiment of the present invention will be described with reference to FIGS. 1 and 15.

Initially, the wavelength of the green light source 1202A is controlled as follows. The output controller 108 keeps the temperature of the SHG crystal 106 constant so that the phase-matched wavelength thereof becomes 1060 nm, and controls the current sources so that the wavelength of the master light source 102 (DBR laser) is modulated with a constant frequency within a width that is 50% of the wavelength allowable width of the used SHG crystal 106. When using periodically poled MgO:LiNbO3 which is adopted in this embodiment, the wavelength can be modulated within a width of 0.1 nm, i.e., within a width of ±0.05 nm from the center wavelength as shown in FIG. 2(a).

A laser of plural wavelengths is outputted from the master light source 102, and the laser combined with the pump laser outputted from the pump LD 101 by the beam combiner is amplified by the Yb-doped clad pump fiber, and the amplified laser is transmitted through the polarizer 105, whereby a second harmonic wave as green light is outputted from the SHG crystal 106, and a portion thereof is outputted to the PD 107.

Then, the laser beams outputted from the respective light sources 1201, 1202A, and 1203 are scanned on diffusion plates 1205a to 1205c by reflection type two-dimensional beam scanning means 1204a to 1204. Image data are divided into R, G, and B, respectively, and signals thereof are input to spatial light modulation elements 1207a to 1207c, and multiplexed by a dichroic prism 1208 to produce a color image. Thus multiplexed image is projected on a screen 1210 by a projection lens 1209.

As described above, in the two-dimensional image display device 1200A according to the first embodiment, the wavelength spectrum width of the green light source 1202A can be broadened, whereby occurrence of speckle noise can be suppressed in the respective light sources including the red light source 1201 and the blue light source 1203.

Further, when a speckle noise removal means such as a diffusion plate or a lenticular lens is disposed in front of the two-dimensional spatial modulation unit and vibrated, the color image multiplexed by the dichroic prism 1208 can further reduce speckle noise.

Further, it is considered that the laser output of the green light source 1202A in the two-dimensional image display device 1200A might be reduced due to the variation in the oscillation wavelength. In this first embodiment, as an output stabilizing operation for preventing variation in output due to the variation in oscillation wavelength, the oscillation wavelength of the fundamental wave is varied on the basis of the output detected by the PD 107. When the output value detected by the PD 107 reduces, the output controller 108 changes the $I_{DBR}$ so as to increase the output. If the output is not recovered even when the wavelength control range of the master light source 102 (DBR laser) is exceeded, the output controller 108 increases the $I_L$ to increase the output of the fundamental laser itself.

Further, during the wavelength control operation of the green light source 1202A, since the wavelength control range is limited to the wavelength allowable range of the crystal, the wavelength control range is limited within a range from 0.05 to 0.5 nm although it depends on the type and length of the used crystal for wavelength conversion. For example, when an element comprising periodically poled MgO:LiNbO3 and having a length of 10 mm is used as a wavelength conversion crystal, although a nonlinear optical constant induced by the wavelength conversion efficiency is as large as deff=14 to 15 pm/V, since the wavelength allowable range is 0.2 nm·cm, the output fluctuates within a range of 100 to 50% when scanning is performed within a wavelength range of 0.2 nm. That is, the wavelength variable width obtained by vibrating the wavelength of the seed light is small. On the other hand, when lithium triborate crystal is used, although the wavelength scanning range can be increased because the wavelength allowable range is 5 nm to 10 nm, since the deff becomes as very small as 0.7 pm/V, the crystal must be constituted as an external resonator. Consequently, it is desirable to adopt periodically poled MgO:LiNbO3 when usability and physical stability of the device are considered.

In the above-mentioned two-dimensional image display device 1200A according to the first embodiment, the green light source 1202A is constituted by the Yb-doped clad pump fiber 103 as a double clad rare-earth-doped fiber as a laser activating substance, the pump LD 101 for exciting the Yb-doped clad pump fiber 103, the polarizer 105 for linearizing the polarization direction, the SHG crystal 106 for reducing the wavelength of the laser light generated by the Yb-doped clad pump fiber 103 to ½, the PD 107 for monitoring the output of the second harmonic wave generated by the SHG crystal 106, and the plural-wavelength oscillation mechanism comprising the master light source 102 having a wavelength-variable semiconductor laser as seed light, the output controller 108 for controlling the laser output on the basis of the output value obtained from the PD 107, the current source 109 for supplying a current to the master light source 102, and the current source 110 for controlling the wavelength of the master light source. Since the rare-earth-doped fiber is used as the green light source 1202A, it is possible to significantly broaden the peak of the fluorescence spectrum relative to the case of using the conventional oxide crystal such as YAG or YVO4. This means that the wavelength variable range (oscillation wavelength range) can be increased. Further, in the green light source 1202A, control for a resonator length such as a laser mirror is dispensed with, and high-speed wavelength control is realized. Therefore, it is possible to reduce speckle noise when the green light source 1202A is mounted on a two-dimensional image display device.

Further, since the second harmonic wave output from the SHG crystal 106 is monitored using the PD 107, it is possible to provide a two-dimensional image display device which can stabilize the laser output, and arbitrarily control the wavelength of the green light.

In the green light source 1202A in the two-dimensional image display device 1200A of the first embodiment, the master light source 102 is controlled by the output controller 108 so as to vary the oscillation wavelength at a constant frequency. However, the wavelength of the master light source may be varied in accordance with the phase-matched wavelength of the crystal, according to temperature variation, whereby the precision of temperature control for the SHG crystal 106 can be reduced, leading to cost reduction. That is, temperature control for the wavelength conversion crystal is simplified, and stable output operation is realized. At this time, the stabilization operation for preventing output variation due to variation in the phase-matched wavelength may be performed in like manner as the above-mentioned output stabilization operation.

Figure 2B:
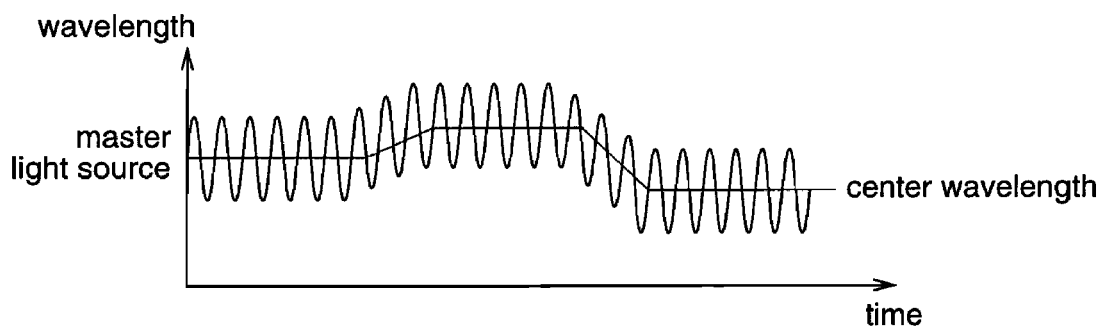

Further, in the green light source 1202A in the two-dimensional image display device 1200A according to the first embodiment, the center wavelength is made constant as shown in FIG. 2(a). However, the present invention is not restricted thereto, and as shown in FIG. 2(b), the center wavelength may be controlled to be varied by feeding back the output signal the power of which is monitored by the PD 107.

Embodiment 2

A two-dimensional image display device according to a second embodiment of the present invention adopts a fiber laser source using a second harmonic wave as a green light source, like in the first embodiment. In this second embodiment, however, in order to increase the oscillation wavelength range, arbitrary two wavelengths are oscillated by a single laser medium, and each wavelength is provided with a wavelength conversion crystal.

A two-dimensional image display device 1200B according to the second embodiment is constituted as shown in FIG. 15, and has a feature in a green light source 1202B. Since the construction of the two-dimensional image display device 1200B is identical to that of the first embodiment, repeated description is not necessary.

Hereinafter, the two-dimensional image display device 1200B according to the second embodiment will be described with reference to FIGS. 3 to 7 and 15.

Figure 3:
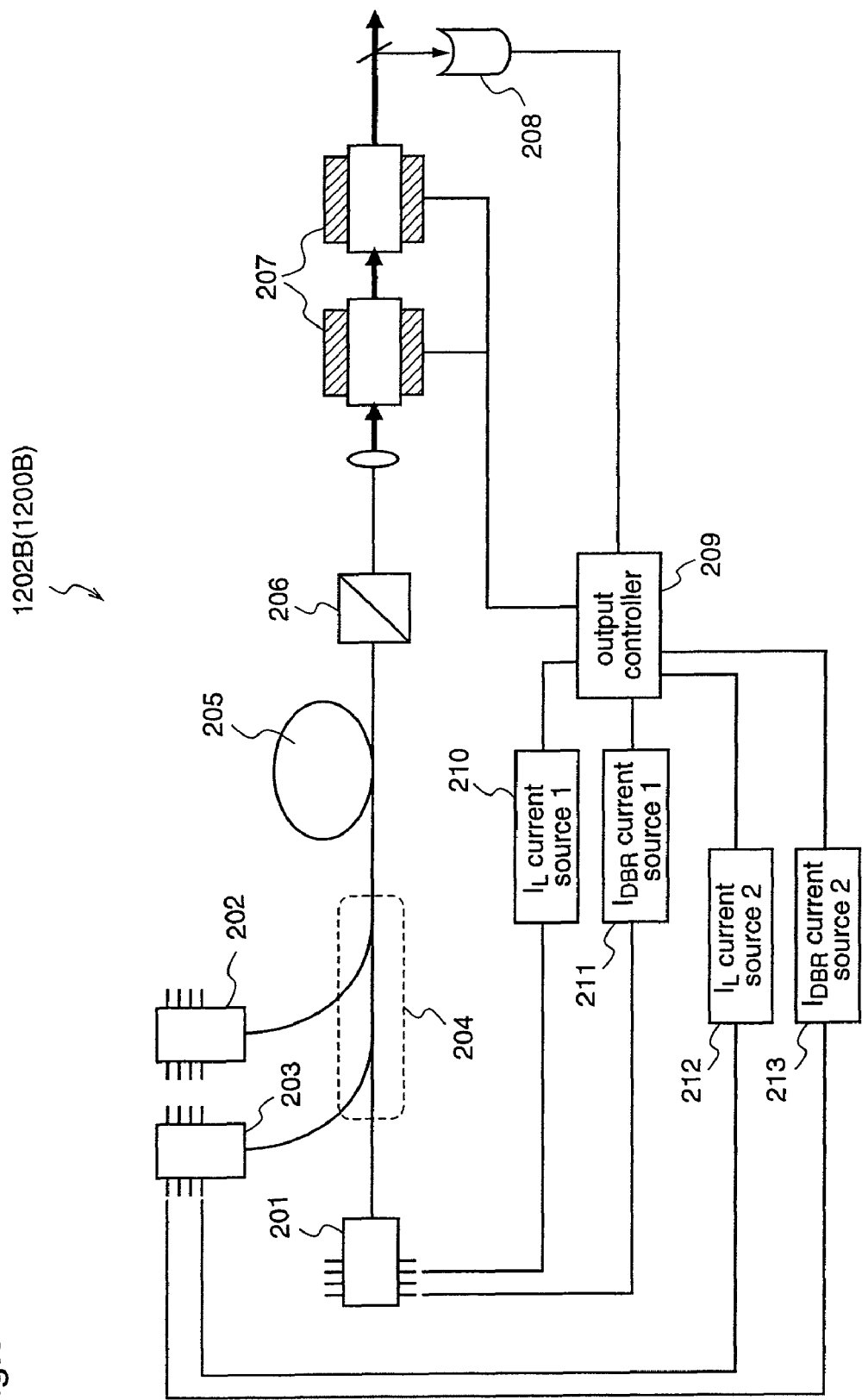
FIG. 3 is a schematic configuration diagram illustrating a green light source mounted on a two-dimensional image display device according to a second embodiment of the present invention.

FIG. 3 is a schematic configuration diagram of the green light source 1202B of the two-dimensional image display device 1200B.

With reference to FIG. 3, the green light source 1202B adopts a Yb-doped clad pump fiber 205 (rare-earth-doped fiber) as a laser medium, a laser diode as a pump laser 201, and DBR (Distributed Bragg Reflector) laser diodes as master light sources 1 and 2 (202 and 203). While in the first embodiment an oscillation frequency of a single master light source is varied with a constant frequency to generate green lights of plural wavelengths, in this second embodiment a plurality of master light sources having different wavelengths are used to generate green lights of plural wavelengths. This construction cannot be realized by an oxide single crystal that has conventionally been used as a laser medium, because the fluorescence spectrum thereof is steep. In this second embodiment, however, since the Yb-doped clad pump fiber 205 is adopted, a peak of the fluorescence spectrum can be significantly increased.

Further, the green light source 1202B comprises a polarizer 206 for linearly polarizing oscillated light, plural SHG crystals 207 for generating second harmonic waves of the oscillated lights of plural wavelengths, a photodiode (PD) 208 for monitoring the outputs of the SHG crystals 207, an output controller 209 for controlling the outputs of the master light sources 1 and 2 (202 and 203) with a constant frequency, controlling the temperatures of the SHG crystals 207, and performing control to make the output constant on the basis of the second harmonic wave outputs detected by the PD 208, and control current sources ($I_L$ current sources 210/212, $I_{DBR}$ current sources 211/213) for controlling the wavelengths and outputs of the master light sources 1 and 2 (202 and 203), respectively, according to a control signal from the output controller 209.

Further, in the green light source 1202B in the two-dimensional image display device 1200B, the oscillation wavelength of the master light source 1 (202) is about 1060 nm while the oscillation wavelength of the master light source 2 (203) is about 1080 nm, and the wavelength of the green light that can be outputted is either 530 nm or 540 nm. The SHG crystals 207 comprise a crystal that makes phase matching with a fundamental wave of 1060 nm and a crystal that makes phase matching with a fundamental wave of 1080 nm. The Yb-added clad pump fiber 205 is excited using the pump LD 201 like the green light source 1202A in the two-dimensional image display device 1200A of the first embodiment, and the polarizer 206 is provided to linearly polarize the oscillated fundamental wave. The oscillated fundamental wave is condensed to the SHG crystals 207, and converted into green light having a wavelength of ½. The converted light output is monitored by the PD 208, and the output controller 209 controls the output of the master light source or minutely controls the wavelength so as to make the output constant. Further, the output controller 209 controls the plural SHG crystals 207 at constant temperatures, respectively, and controls the $I_L$ current sources 210 and 212 and the $I_{DBR}$ current sources 211 and 213, thereby to make the master light sources 1 and 2 (202 and 203) output laser lights with a constant frequency.

Figure 4A:
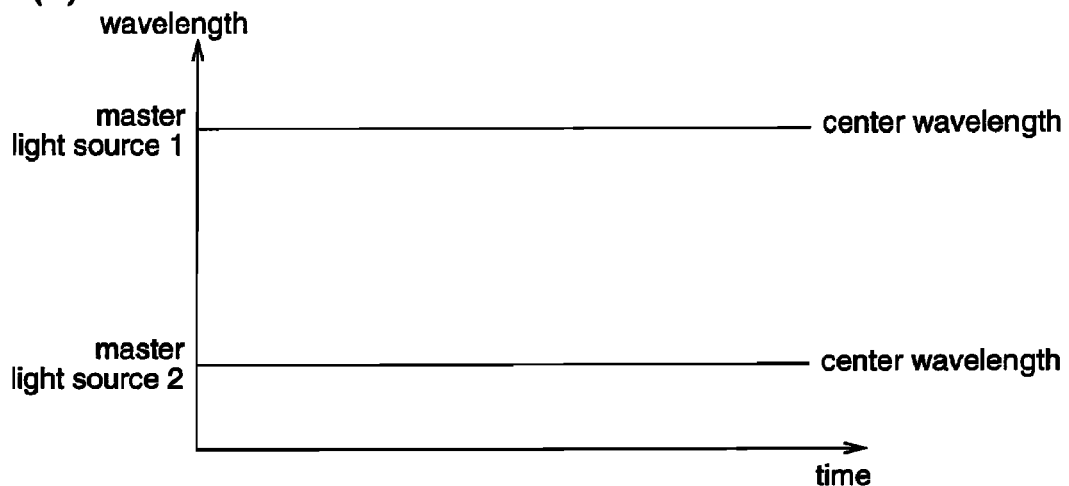
FIGS. 4(a), 4(b), and 4(c) are diagrams illustrating wavelength amplitudes of master light sources in the green light source mounted on the two-dimensional image display device according to the second embodiment.

FIG. 4(a) shows the wavelengths of the respective master light sources 1 and 2 (202 and 203). The outputs from the master light sources 1 and 2 (202 and 203) having different wavelengths are switched by the output controller 209 on a constant cycle, for example, with a frequency of several hundreds of kHz.

Further, since the phase-matched wavelength of the SHG crystal generally varies with the temperature thereof, the temperature of the SHG crystal is controlled with a precision of 0.01° C. In the green light source 1202B of the second embodiment, the SHG crystals are temperature-controlled so that the phase-matched wavelengths thereof become 1060 nm and 1080 nm, respectively.

As described above, in the green light source 1202B in the two-dimensional image display device 1200B of the second embodiment, a plural-wavelength oscillation mechanism is constituted by the master light sources 1 and 2 (202 and 203), the output controller 209, the $I_L$ current sources 210 and 212, and the $I_{DBR}$ current sources 211 and 213, thereby providing plural oscillation wavelengths of laser.

Next, the operation of the two-dimensional image display device 1200B according to the second embodiment will be described with reference to FIGS. 3 and 15.

Initially, the wavelength of the green light source 1202B is controlled as follows. The output controller 108 keeps the plural SHG crystals 207 at constant temperatures so that the phase-matched wavelengths thereof become 1060 nm and 1080 nm, respectively, and controls the $I_L$ current sources 210 and 212 and the $I_{DBR}$ current sources 211 and 213 so that the laser outputs from the master light sources 1 and 2 (202 and 203) of different wavelengths are outputted at a constant frequency, respectively.

Then, the lasers of constant wavelengths are outputted from the master light sources 1 and 2 (202 and 203), respectively, and multiplexed with the pump laser outputted from the pump LD 201 by the beam combiner 204. The multiplexed laser is amplified by the Yb-doped clad pump fiber 205, and transmitted through the polarizer 206, whereby second harmonic waves as green lights are outputted from the respective SHG crystals 207, and a portion thereof is outputted to the PD 208.

The laser beams emitted from the respective light sources 1201, 1202B, and 1203 are scanned on the diffusion plates 1205a to 1205c by the reflection type two-dimensional beam scanning means 1204a to 1204c. The image data are divided into R, G, and B, and the signals thereof are input to the spatial light modulation elements 1207a to 1207c and multiplexed by the dichroic prism 1208 to produce a color image. The produced image is projected on the screen 1210 by the projection lens 1209.

As described above, in the two-dimensional image display device 1200B according to the second embodiment, the wavelength spectrum width of the green light source 1202B can be further broadened, and occurrence of speckle noise can be suppressed in the respective light sources including the red light source 1201 and the blue light source 1203.

Furthermore, when a speckle noise removal means such as a diffusion plate or a lenticular lens is disposed in front of the two-dimensional spatial modulation unit and the speckle noise removal means is vibrated, speckle noise can be further reduced by the respective light sources 1201, 1202B, and 1203, and the color image multiplexed by the dichroic prism 1208 can further reduce speckle noise.

When the laser output of the green light source 1202B is lowered, an output stabilizing operation is performed as in the first embodiment.

Next, a description will be given of the timing of switching the laser outputs from the master light sources 1 and 2 (202 and 203) by the output controller 209 of the green light source 1202B in the two-dimensional image display device 1200B according to the second embodiment, with reference to FIG. 5.

FIG. 5 is a plot diagram in which the currents inputted to the respective master light sources 1 and 2 (202 and 203) and the intensities of green lights are plotted with respect to the time axis. As shown in FIG. 5, it is possible to arbitrarily set which one of the green lights having the wavelengths of 540 nm and 530 nm should be obtained. For example, when the laser is oscillated with different wavelengths for each shot at a cyclic frequency of 100 kHz, a time chart as shown in FIG. 5 is obtained. However, it is also possible to oscillate the laser with different wavelengths for every 5 shots or 10 shots, and further, it is also possible to operate the laser with a duty ratio of the currents injected into the respective master light sources being varied.

It has conventionally been known that green lights (530 nm, 540 nm) can be obtained by oscillating light sources using fiber lasers at wavelengths of 1060 nm and 1080 nm and then performing wavelength conversion. FIG. 6 is a plot diagram illustrating the relationship between the light wavelength and the luminosity factor of human eye (6(a)), and the color expression range on the chromaticity diagram (6(b)).

Figure 6A:
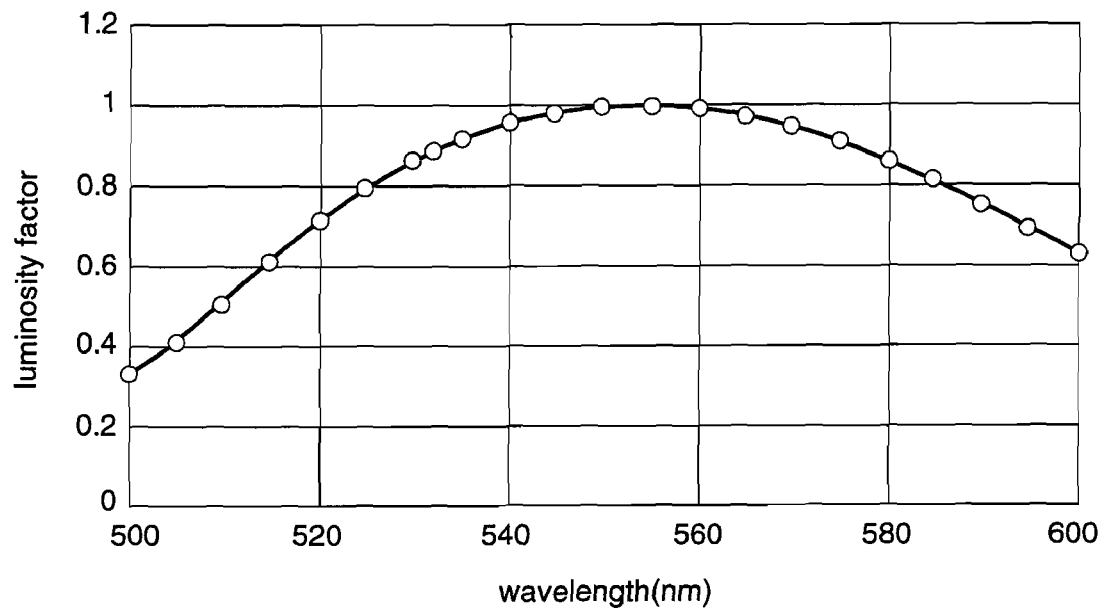
FIG. 6(a) is a plot diagram of luminosity factors of human eye to light wavelengths.
Figure 6B:
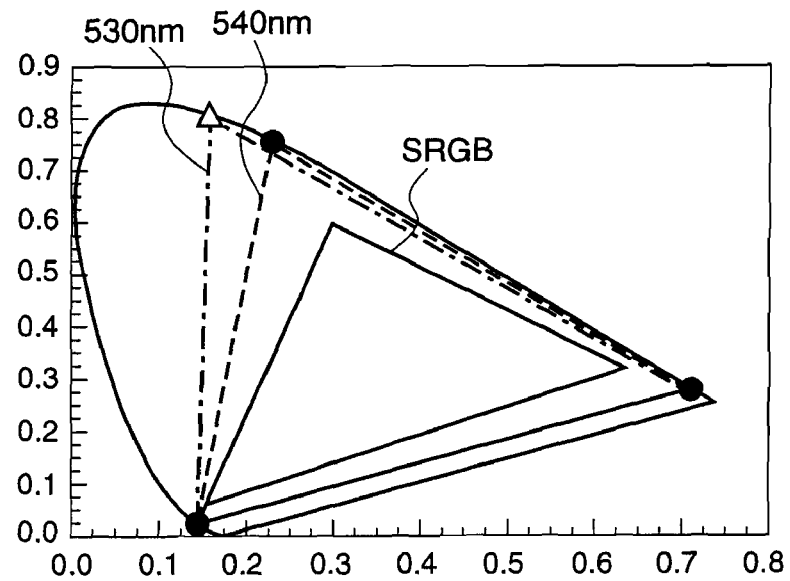
FIG. 6(b) is a chromaticity coordinate diagram in which a color expression range of the second embodiment is compared with a color expression range of the SRGB standard.

As shown in FIG. 6(a), the luminosity factor to the 530 nm light is about 80% of the luminosity factor to the 540 nm light. Therefore, when 1080 nm is selected, since the luminosity factor of the human eye to the light after wavelength conversion (540 nm) is high, the green light output to obtain the same brightness for the viewer is about 80% as compared with the case of selecting 1060 nm, and thereby power consumption of the device can be reduced, while the color reproducibility is degraded. On the other hand, when 1060 nm is selected, although it is superior in the color reproducibility, about 1.3 times of the green light output is required. In addition, since the efficiency of the fiber laser is degraded as the oscillation wavelength becomes shorter, power consumption is significantly increased. Thus, the conventional construction has the conflicting problems as described above. So, an advantage of the two-dimensional image display device 1200B using the green light source 1202B of the second embodiment resides in that the lights whose fundamental waves are apart by 20 nm or more can be selectively outputted, and thereby the green lights which are apart by 5 nm can be outputted. Therefore, both the color reproducibility and the brightness can be improved by selectively outputting the light of 540 nm having a high luminosity factor and the light of 530 nm having an enhanced color reproducibility while the luminosity factor is inferior, thereby resolving the problems of the conventional construction.

Further, when plural wavelengths are simultaneously oscillated, an output power variation might occur due to mode competition. Therefore, the construction of the second embodiment is desirable because the oscillation wavelength can be arbitrarily set, and the laser is oscillated with only one wavelength instantaneously and thereby such output power variation can be reduced.

Further, FIG. 7 is a plot diagram illustrating the relationship between the intensity difference of contrast when video is uniformly projected onto the screen, and the oscillation wavelength interval of green lights having two wavelengths, as an index expressing speckle noise that is sensed by the human eye. The standard of the speckle noise intensity which is sensed by the human eye as "speckle noise exists" is roughly 0.02 or less. In FIG. 7, a point 501 indicates the speckle noise intensity obtained when the oscillation wavelength is single, and this is defined as "1". A point 502 shows the degree of speckle noise reduction in the construction described for the first embodiment. Since the point 502 indicates 0.85, it is found that the speckle noise is reduced by about 15% as compared with the single wavelength. A point 503 shows the degree of speckle noise reduction in the construction according to the second embodiment. Since the point 503 is lower than 0.2, it is found that the speckle noise is reduced by more than 80%. When a speckle noise reduction mechanism using an optical member such as an oscillation diffusion plate is combined with these light sources, the speckle noise can be reduced by 98% or more, whereby no speckle noise is sensed by the human eye.

As described above, in the two-dimensional image display device 1200B relating to the second embodiment, the green light source 1202B is constituted by the Yb-doped clad pump fiber 205 as a laser activation substance, the pump LD 201 for exciting the Yb-doped clad pump fiber 205, the plural-wavelength oscillation mechanism including the plural master light sources 1 and 2 (202 and 203) which have different oscillation wavelengths and are provided with wavelength-variable semiconductor lasers as seed lights, and outputs plural wavelengths from the respective master light sources 1 and 2 (202 and 203) according to the output controller 209 and the control current sources 210 to 213, and the plural SHG crystals 207 for shortening the wavelengths of the laser lights that are outputted with the plural wavelengths. Therefore, the range of the oscillation wavelength can be further increased, and speckle noise in the display image can be effectively reduced.

Further, since the second harmonic outputs from the SHG crystals 207 are monitored by the PD 208, the laser output is stabilized, and the wavelength of the green light can be arbitrarily controlled.

Further, since the rare-earth-doped fiber is adopted, it is possible to significantly broaden the peak of the fluorescent spectrum as compared with the case of using the conventional oxide crystal such as YAG or YVO4. This means that the wavelength variable range (oscillation wavelength range) can be increased.

Further, since control for a resonator length such as a laser mirror is not required, high-speed wavelength control can be achieved. Therefore, it becomes possible to vary the oscillation wavelength for every 5000 shots at a cyclic frequency of 100 kHz, whereby reduction in speckle noise is realized when the green laser light source 1202B is mounted on a two-dimensional image display device.

Further, since a diffusion plate, a lenticular lens, a hologram element, a rod prism, or the like is used as a speckle noise removal mechanism, speckle noise in the display image can be further reduced.

Furthermore, it is possible to generate a wavelength of a high luminosity factor when brightness is required, and generate an optimum wavelength for representing color when color representation is considered as important, by varying the duty ratio of the currents injected into the respective master light sources.

Figure 4B:
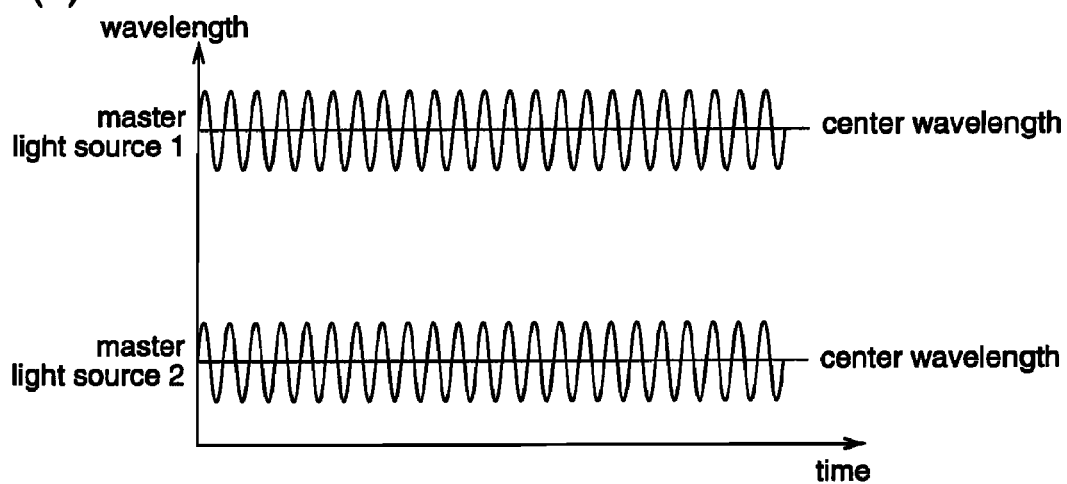

In this second embodiment, the output controller 209 controls the control current sources so that the master light sources 1 and 2 (202 and 203) having different wavelengths as shown in FIG. 4(a) output lasers with a constant frequency, respectively. At this time, as shown in FIG. 4(b), the oscillation wavelengths of the lasers outputted from the respective master light sources 1 and 2 (202 and 203) may be varied by the output controller as in the first embodiment, whereby further reduction in speckle noise can be achieved. Further, the temperature control and the output stabilizing operation at this time may be performed as in the first embodiment. The precision of temperature control at this time may be lowered.

Further, in this second embodiment, the output controller 209 controls the control current sources so that the master light sources 1 and 2 (202 and 203) having different wavelengths as shown in FIG. 4(a) output lasers with a constant frequency, respectively. However, the present invention is not restricted thereto, and the wavelengths of the master light sources may be varied in accordance with the phase-matched wavelength of the crystal, according to temperature variation, whereby the precision of temperature control for the SHG crystals 207 can be further reduced, leading to further cost reduction. At this time, the temperature control and the output stabilizing operation may be performed as described for the first embodiment.

Figure 4C:
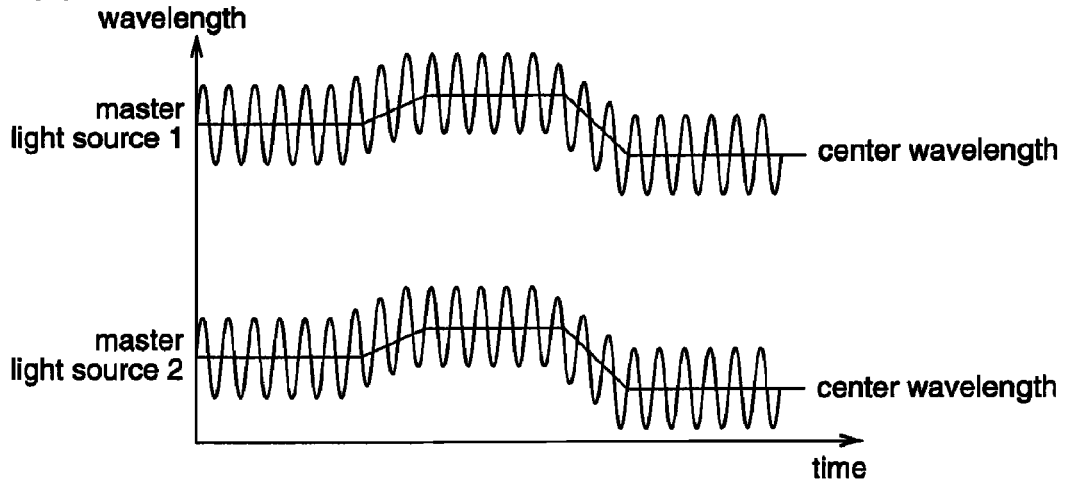

Further, in this second embodiment, the respective oscillation wavelengths are made constant as shown in FIG. 4(a), or the oscillation wavelengths are varied as shown in FIG. 4(b). However, the present invention is not restricted thereto, and as shown in FIG. 4(c), the center wavelengths may be controlled and varied by feeding back the output signal the power of which is monitored by the PD 208.

Further, while in this second embodiment the green light source having two master light sources has been described, the present invention is not restricted thereto, and the green light source may be provided with more than two master light sources, with the same effect as mentioned above.

Furthermore, it is needless to say that there are various methods for oscillating plural wavelengths, other than those mentioned in this second embodiment.

Embodiment 3

A two-dimensional image display device according to a third embodiment of the present invention adopts a green light source which uses a common pump laser light source instead of using an expensive DFB laser, constitutes a laser resonator by providing fiber gratings at both ends of a rare-earth-doped fiber as a laser activating substance, and varies a laser oscillation wavelength by temperature-controlling at least one of the fiber gratings.

The construction of the two-dimensional image display device 1200C according to the third embodiment is shown in FIG. 15, and it is characterized by the green light source 1202C. Since the construction of the two-dimensional image display device 1200C is identical to that of the first embodiment shown in FIG. 15, repeated description is not necessary.

Hereinafter, the two-dimensional image display device 1200C according to the third embodiment will be described with reference to FIGS. 8 to 11 and 15.

Figure 8:
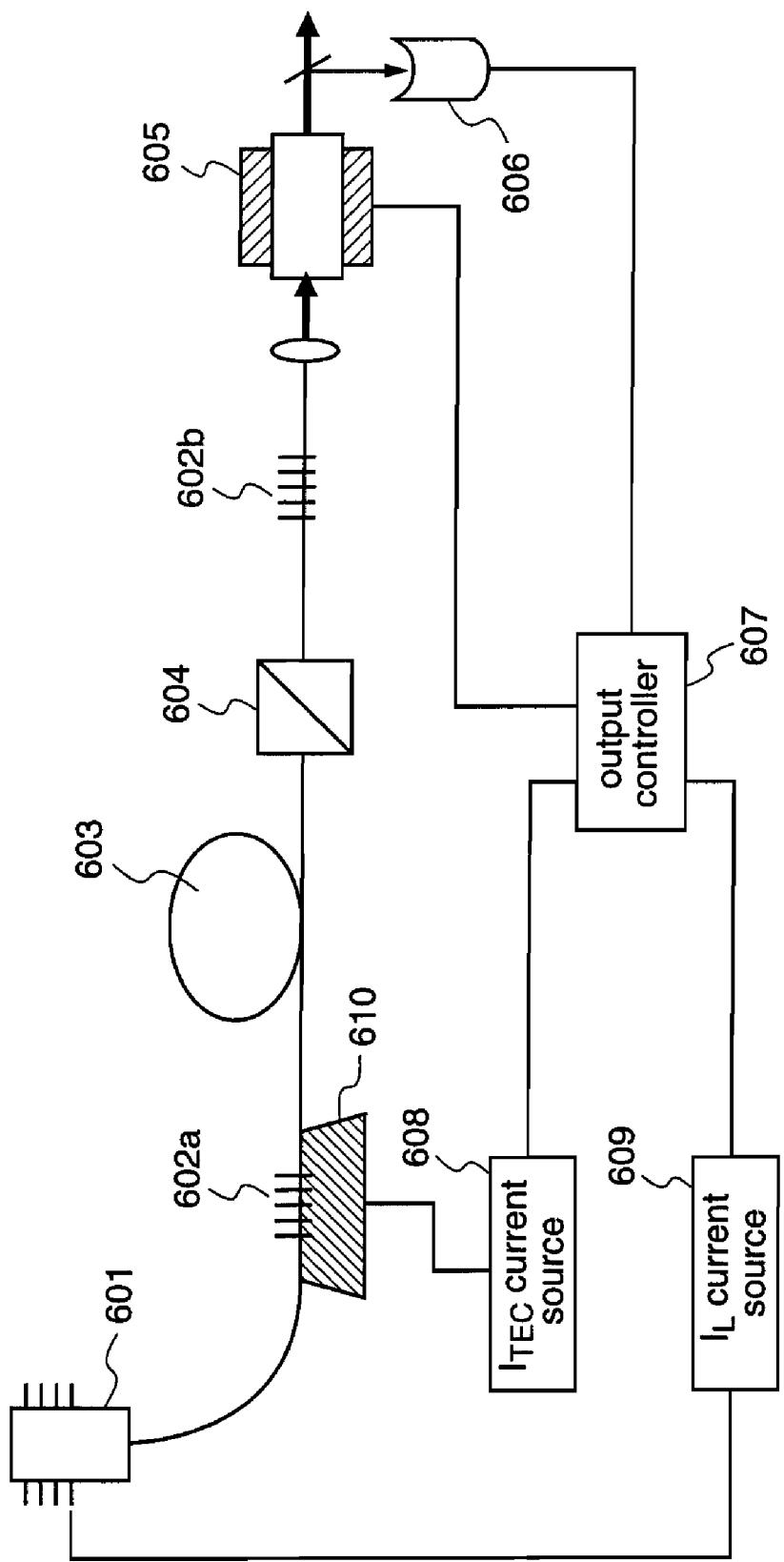
FIG. 8 is a schematic configuration diagram illustrating a green light source mounted on a two-dimensional image display device according to a third embodiment of the present invention.

FIG. 8 is a schematic diagram illustrating the construction of the green light source 1202C in the two-dimensional image display device 1200C according to the third embodiment.

In FIG. 8, the green light source 1202C uses a Yb-doped clad pump fiber 603 as a laser medium, and a laser diode as a pump laser 601. A set of fiber bragg gratings 602a and 602b are disposed at the both ends of the Yb-doped clad pump fiber 603 to constitute a laser resonator, and at least one of the gratings is temperature-controlled by a Peltier element. Further, the green light source 1202C includes a polarizer 206 for linearly polarizing the oscillated light, a SHG crystal 605 for generating a second harmonic wave of the oscillated light, a photodiode (PD) 606 for monitoring the output of the SHG crystal 605, an output controller 607 for controlling the temperature of the fiber bragg grating 602a and the temperature of the SHG crystal 605, and performing control to make the output constant on the basis of the second harmonic wave detected by the PD 606, and control current sources ($I_L$ current source 609, $I_{TEC}$ current source 608) for controlling the output of the pump LD 601 and the temperature of the fiber grating according to a control signal from the output controller 607.

The fiber bragg gratings 602a and 602b disposed on the both ends of the Yb-added clad pump fiber 603 have reflection bands of 0.1 nm and 1 to 5 nm, respectively, and the grating having the narrower reflection band (0.1 nm) is temperature-controlled by the control signal from the output controller 607. This temperature control controls the reflection center wavelength of the narrow-band grating.

Since the phase-matched wavelength of the SHG crystal 605 significantly varies depending on the temperature thereof, it is temperature-controlled with a precision of 0.01° C. In the green light source 1202C in the two-dimensional image display device of the third embodiment, the SHG crystal 605 is temperature-controlled so as to have a constant phase-matched wavelength. The precision of the temperature control may be reduced. In this case, cost reduction is achieved although the phase-matched wavelength varies with temperature variation.

As described above, in the green light source 1202C in the two-dimensional image display device of the third embodiment, a plural-wavelength oscillation mechanism is constituted by the fiber gratings 602a and 602b, the Peltier element 610, the output controller 607, the $I_{TEC}$ current source 608, and the $I_L$ current source 609, thereby converting the oscillation wavelength of the laser into plural wavelengths.

Next, the operation of the two-dimensional image display device 1200C according to the third embodiment will be described with reference to FIGS. 8 and 15.

Initially, control for the wavelength of the green light source 1202C is realized as follows. That is, the output controller 607 keeps the temperature of the SHG crystal 605 constant, and controls the current sources so that the oscillation wavelength of the fiber laser is modulated with a constant frequency by varying the temperature of the fiber grating 602a at a constant frequency, within a width corresponding to 50% of the wavelength allowable width of the used SHG crystal 605. When adopting periodically poled MgO:LiNbO3, the oscillation wavelength can be varied within a width of 0.1 nm.

Then, lasers of plural wavelengths are outputted from the fiber grating 602a, amplified by the Yd-doped clad pump fiber 603 that is excited by the pump LD 601, and transmitted through the polarizer 604, whereby a second harmonic wave as green light is outputted from the SHG crystal 605, and a portion thereof is outputted to the PD 606.

Then, the laser beams emitted from the respective light sources 1201, 1202C, and 1203 are scanned on the diffusion plates 1205a to 1205c by the reflection type two-dimensional beam scanning means 1204a to 1204c. The image data is divided into R, G, B, and the R, G, B signals are input to the spatial light modulators 1207a to 1207c, and multiplexed by the dichroic prism 1208 to form a color image. The multiplexed image is projected on the screen 1210 by the projection lens 1209.

As described above, in the two-dimensional image display device 1200C according to the third embodiment, the wavelength spectrum width of the green light source 1202C can be broadened, and occurrence of speckle noise can be suppressed in the respective light sources including the red light source 1201 and the blue light source 1203.

Further, when a speckle noise removal means such as a diffusion plate or a lenticular is disposed in front of the two-dimensional spatial modulator and vibrated, speckle noise can be reduced by the respective light sources 1201, 1202C, and 1203, and the color image multiplexed by the dichroic prism 1208 can further reduce speckle noise.

Further, it is considered that the laser output might be lowered when the oscillation wavelength varies. In this third embodiment, however, in order to prevent such output variation due to the oscillation wavelength variation, the oscillation wavelength of the fundamental wave is varied on the basis of the output detected by the PD 606 to stabilize the output, as in the first embodiment. In this third embodiment, the oscillation wavelength of the fundamental wave is varied by varying the period of the fiber grating 602a while the oscillation wavelength of the master light source is varied in the first embodiment. When the output value detected by the PD 606 is lowered, the $I_{TEC}$ is varied to increase the output. Generally, the oscillation wavelength is lengthened when the temperature of the fiber grating 602a increases, and it is shortened when the temperature decreases. When the output is not recovered even when the oscillation wavelength exceeds the wavelength control range of the fiber grating 602a, the $I_L$ is increased to increase the output of the pump LD 601 instead of increasing the output of the master light source as in the first embodiment, thereby increasing the output of the fundamental laser itself.

Figure 9:
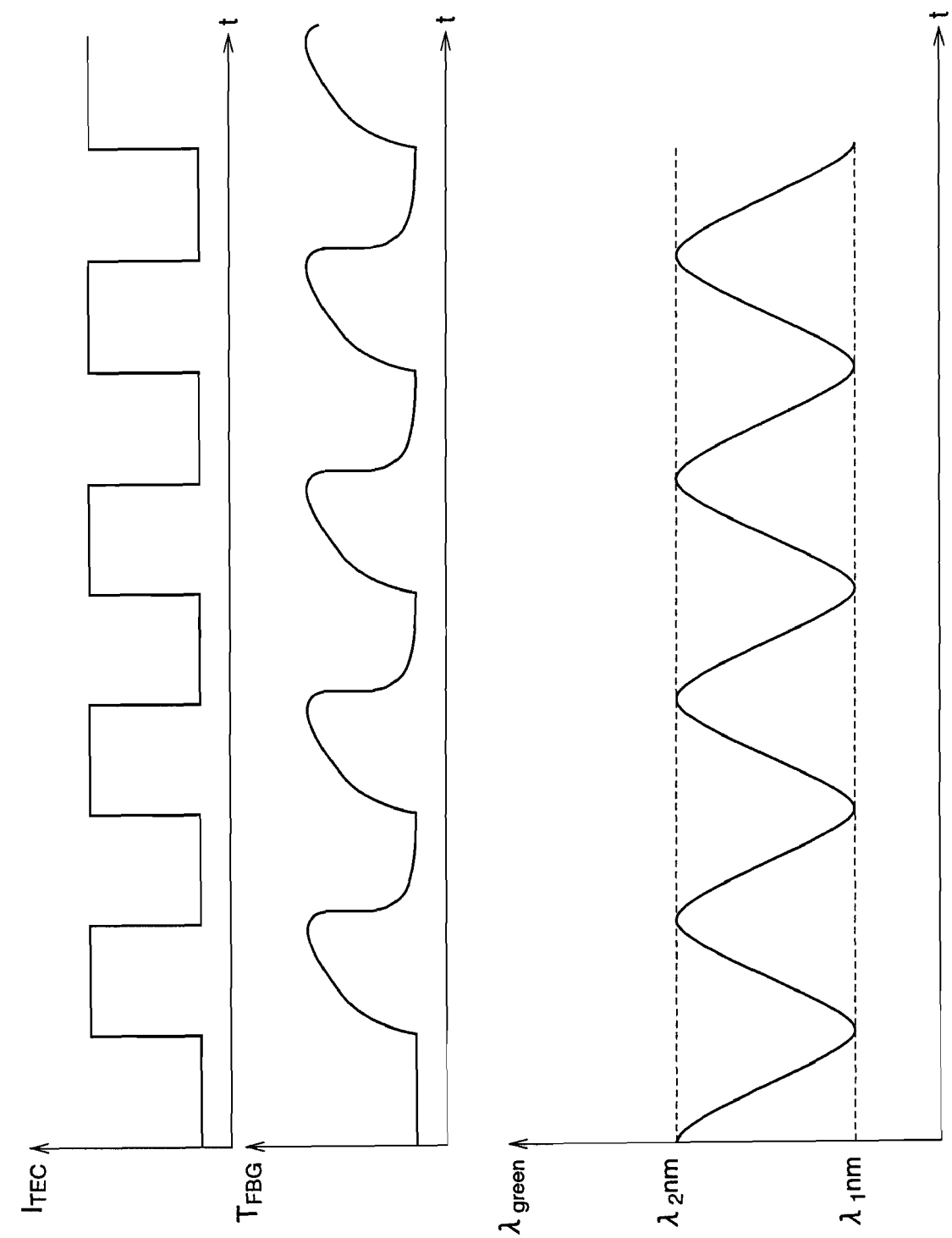
FIG. 9 is a plot diagram illustrating the relationship between Peltier driving current and temperature of fiber grating, and the oscillation wavelength of green light output.

FIG. 9 is a plot diagram in which the currents inputted to the Peltier element 610 disposed on the fiber grating, the temperature of the fiber grating 602a, and the intensity of the green light are plotted. As shown in FIG. 9, it is possible to arbitrarily set which one of the green light having a wavelength of λ1 and the green light having a wavelength λ2 should be obtained. In this third embodiment, since the wavelength control is performed utilizing heat, the wavelength change speed is gentle. Therefore, while it is difficult to change the wavelength for each shot, it is possible to operate the laser with the duty ratio of the currents injected into the Peltier element 610 being varied.

In this third embodiment, the output controller 607 controls the temperature of the fiber grating 602a so as to vary the oscillation wavelength of the laser at a constant frequency. However, since the wavelength shift with respect to the temperature is gentler in the fiber grating than in the SHG crystal, the oscillation wavelength of the laser may be varied by varying the temperature of the fiber bragg grating in accordance with the phase-matched wavelength of the crystal, whereby the precision in controlling the temperature of the SHG crystal can be further lowered, leading to cost reduction.

Furthermore, the green light source 1202C in the two-dimensional image display device 1200C according to the third embodiment adopts one fiber grating that is temperature-controlled by the Peltier element. However, when the green light source 1202C is provided with plural fiber gratings, it is possible to achieve the same effect as that of the green light source in the two-dimensional image display device using two master light sources which has been described for the second embodiment. A first modification of the third embodiment which is constituted as mentioned above is schematically illustrated in FIG. 10.

Figure 10:
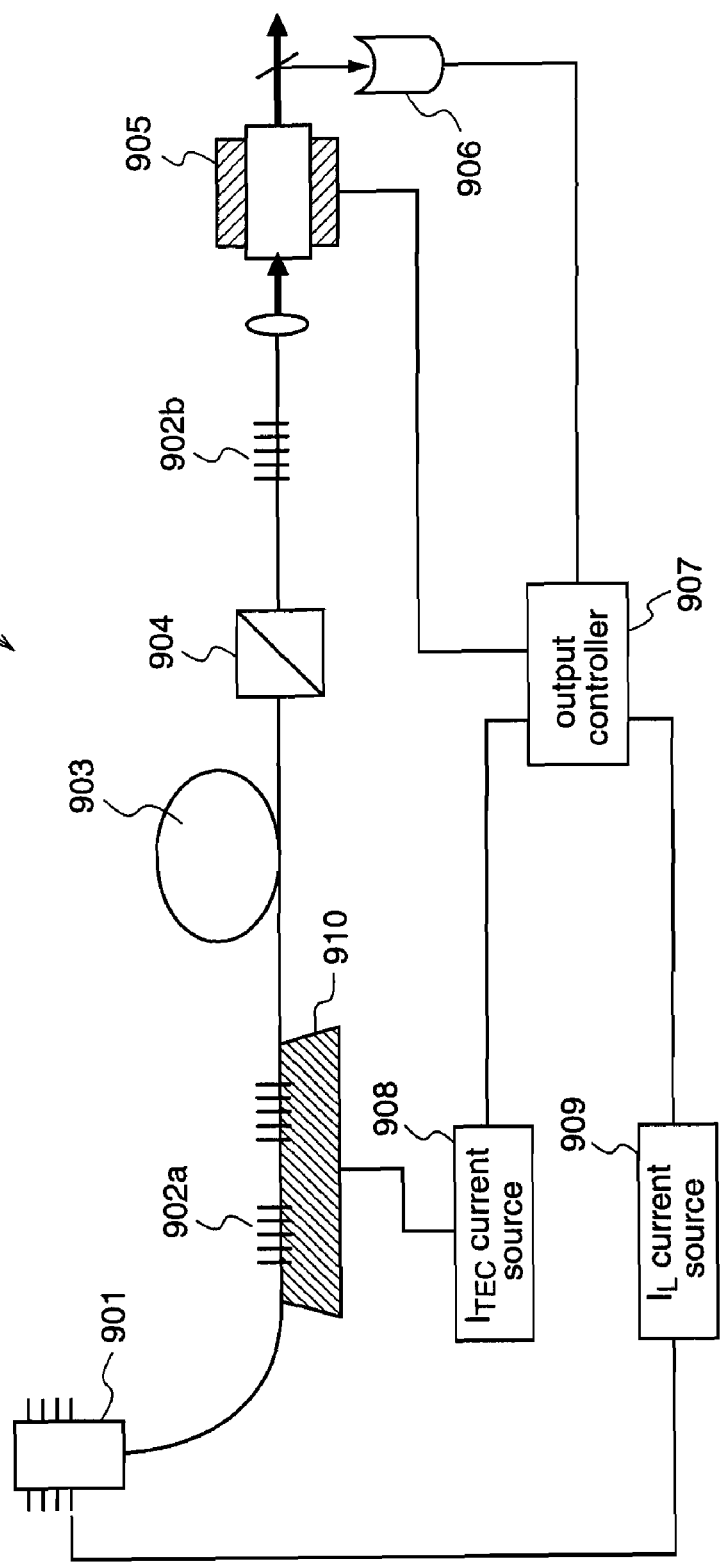
FIG. 10 is a schematic configuration diagram illustrating a first modification of the green light source mounted on the two-dimensional image display device according to the third embodiment of the present invention.

In FIG. 10, a green light source 1202$C_2$ is designed such that fiber gratings 902a and 902b are disposed at both ends of a Yb-doped clad pump fiber 903, and the fiber grating 902a has plural reflection center wavelengths, whereby plural wavelength can be simultaneously oscillated, in contrast to the second embodiment wherein plural wavelengths are alternately oscillated. As for a combination of the fiber gratings 902a and 902b to be used individually, for example, a grating having a reflection band of 22 nm (center wavelength=1075 nm) is provided in the fiber grating 902b, and fiber gratings having a reflection band of 0.1 nm and center wavelengths that are apart by 16 nm (center wavelengths=1064 nm and 1080 nm) are provided in the fiber grating 902a, whereby two wavelengths of 532 nm and 540 nm can be oscillated simultaneously. At this time, the fiber grating 902a having the narrower reflection band (0.1 nm) is temperature-controlled by the Peltier element 910. When no temperature control is performed, the fiber grating is heated as the light output increases, which causes fluctuation of the oscillation wavelength.

Figure 11:
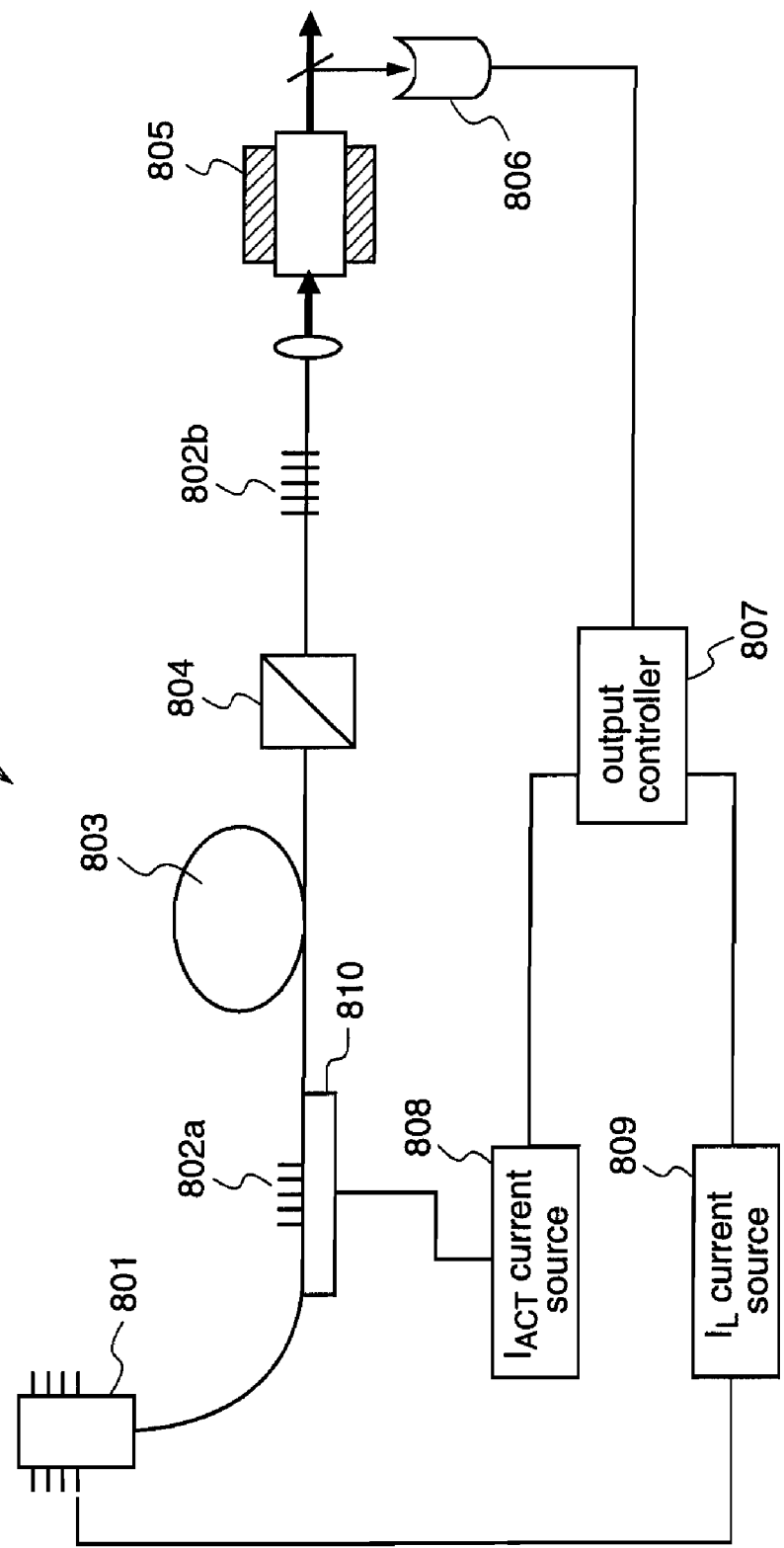
FIG. 11 is a schematic configuration diagram illustrating a second modification of the green light source mounted on the two-dimensional image display device according to the third embodiment of the present invention.

Hereinafter, a green light source 1202D in a two-dimensional image display device 1200D, which performs wavelength control by controlling the tension of the fiber grating with an actuator, instead of performing wavelength control by the temperature of the fiber grating, will be described as a second modification of the third embodiment, with reference to FIG. 11.

The green light source 1202D uses a Yb-doped clad pump fiber 803 as a laser medium, and a laser diode as a pump laser 801. A set of fiber bragg gratings 802a and 802b for constituting a laser resonator are disposed at both ends of the Yb-added clad pump fiber 803, and at least one of the gratings is tension-controlled by a piezo actuator 810. Further, the green light source 1202D includes a polarizer 804 for linearly polarizing the oscillated light, a SHG crystal 805 for generating a second harmonic wave of the oscillated light, a photodiode (PD) 606 for monitoring the output of the SHG crystal, an output controller 807 for performing a control to make the output constant on the basis of the second harmonic wave detected by the output monitor, and control current sources ($I_L$ current source 809, $I_{ACT}$ current source 808) for controlling the piezo actuator 810 that determines the output of the pump LD light source and the tension of the fiber grating, according to a control signal from the output controller.

The fiber bragg gratings 802a and 802b disposed at the both ends of the Yb-doped clad pump fiber 803 are a set of a grating having a reflection band of 0.1 nm and a grating having a reflection band of 1 to 5 nm, and the grating of the narrower reflection band (0.1 nm) is provided with the piezo actuator 810 which controls the tension of the grating. This tension control controls the reflection center wavelength of the grating with the narrower band.

Generally, since the phase-matched wavelength of the SHG crystal significantly varies depending on the temperature of the crystal, it is temperature-controlled with precision of 0.01° C. On the other hand, the fiber grating 802a has relatively gentle wavelength shift with respect to the tension as compared with the wavelength shift of the SHG crystal 805 with respect to the temperature. Focusing attention on this point, in this third embodiment, the tension of the fiber bragg grating 802a is varied in accordance with the phase-matched wavelength of the crystal to vary the oscillation wavelength of the laser, whereby the precision of the temperature control for the SHG crystal 805 can be further reduced, leading to cost reduction.

Also in this construction, similar wavelength control effect can be achieved by the control method similar to the wavelength control by temperature.

As described above, the construction according to the third embodiment is characterized by that the operation speed is lowered because the wavelength control speed is determined by the thermal capacity in the vicinity of the fiber, in contrast to the constructions according to the first and second embodiments. Therefore, although it is difficult to vary the wavelength for every predetermined number of shots, the wavelength can be varied periodically with the light of the continuous wave.

In the above-mentioned two-dimensional image display device 1200C according to the third embodiment, the green light source 1202C is constituted by the Yb-doped clad pump fiber 603 (a double clad rare-earth-doped fiber) as a laser medium, the pump laser 601 for exciting the Yb-doped clad pump fiber 603, the set of fiber bragg gratings 602a and 602b used as laser reflection mirrors, one of the gratings being temperature-controlled by the Peltier element 610, the polarizer 604 for changing the polarization direction to the linear direction, the SHG crystal 605 for reducing the wavelength of the laser light emitted from the Yb-doped clad pump fiber 603 to ½, the PD 606 for monitoring the output of the second harmonic wave generated from the SHG crystal 605, the output controller 607 as the plural-wavelength oscillation mechanism for controlling the output of the laser according to the output value from the PD 606, and controlling the temperature of the fiber grating to displace the grating period, the current source for flowing current to the pump light source 601 under control of the output controller 607, and the control current source for controlling the period of the grating under control of the output controller 607. Therefore, the green light source 1202C can be used when the output of the laser must be a continuous wave, and further, the component cost can be reduced because a laser for injection seeding is dispensed with.

Further, since the second harmonic wave output from the SHG crystal is monitored using the photodiode, it is possible to provide a two-dimensional image display device which can stabilize the laser output, and arbitrarily control the wavelength of green light.

Embodiment 4

In a two-dimensional image display device according to a fourth embodiment of the present invention, the duty ratio of the plural oscillation wavelengths is varied according to the video signal to output a video required to have brightness and a video required to have color reproducibility, respectively.

In the two-dimensional image display device 1200E according to the fourth embodiment, the green light source 1202 shown in FIG. 15 which is the schematic diagram illustrating the above-mentioned two-dimensional image display device is replaced with the green light source 1202B according to the second embodiment.

In the green light source 1202B, for example, either light having a wavelength of 526 nm or light having a wavelength of 540 nm can be arbitrarily oscillated, and thereby speckle noise can be reduced to 20% or less of that in the case of the single wavelength, as already described for the second embodiment. Further, when a diffusion plate is disposed and vibrated in front of the field lens that is disposed in front of the spatial modulator such as a liquid crystal element, a difference in levels of contrast due to speckle noise can be reduced to a level (2% or less) at which the human eye does not sense speckle noise.

Figure 13:
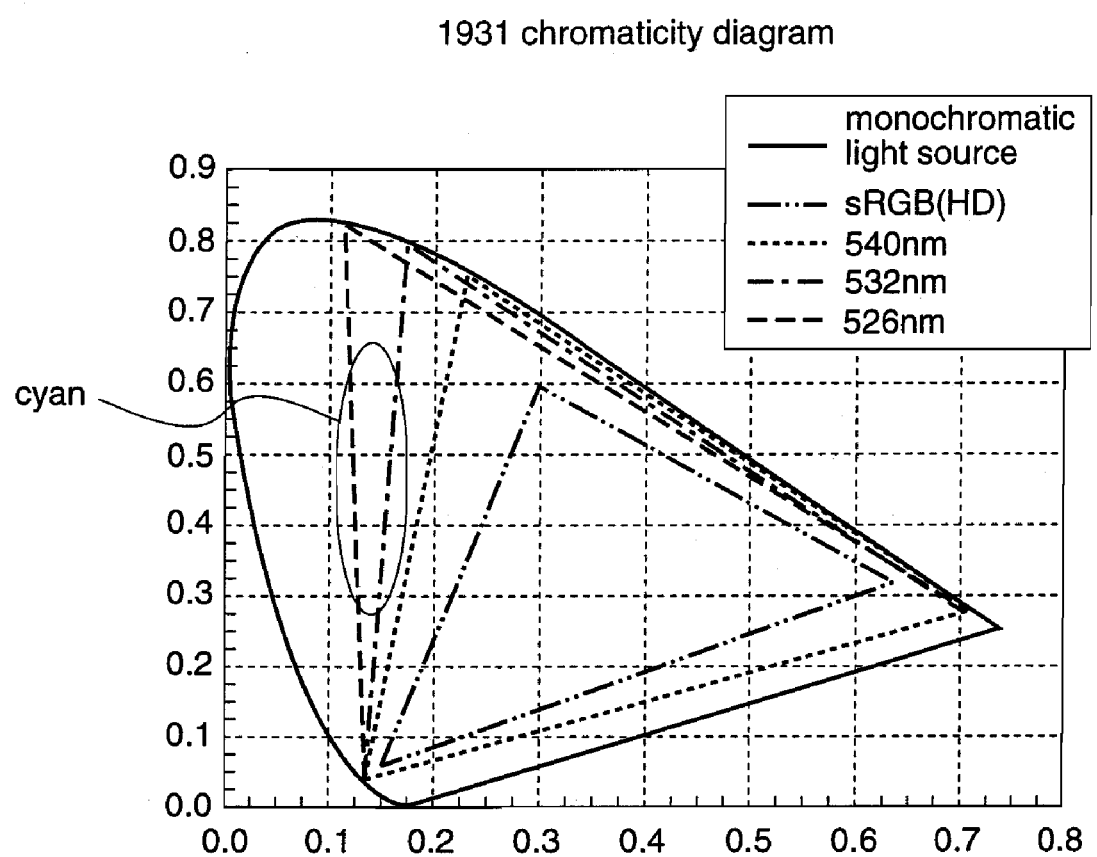
FIG. 13 is a plot diagram illustrating the relationship between the wavelength of green light and the color expression range.

It is known that the color expression range of video varies as the oscillation wavelength of green light varies. FIG. 13 is a plot diagram illustrating the relationship between the wavelength of the green light and the color expression range. Since the wavelength of 540 nm has a high luminosity factor, less projection power is needed to obtain the same brightness, but it has a problem that "cyan series" colors which are needed to express the color of sea cannot be obtained. On the other hand, although the wavelength of 526 nm can reproduce the "cyan series" colors, it has a problem that a projection power three times as high as that for 540 nm is required because the luminosity factor thereof is low.

In order to solve these problems, in the two-dimensional image display device 1200E according to the fourth embodiment, the oscillation wavelength of the laser light is varied depending on the type of video or the usage condition, whereby brighter video can be displayed with the same power consumption by utilizing the luminosity factor of the human eye.

Figure 12:
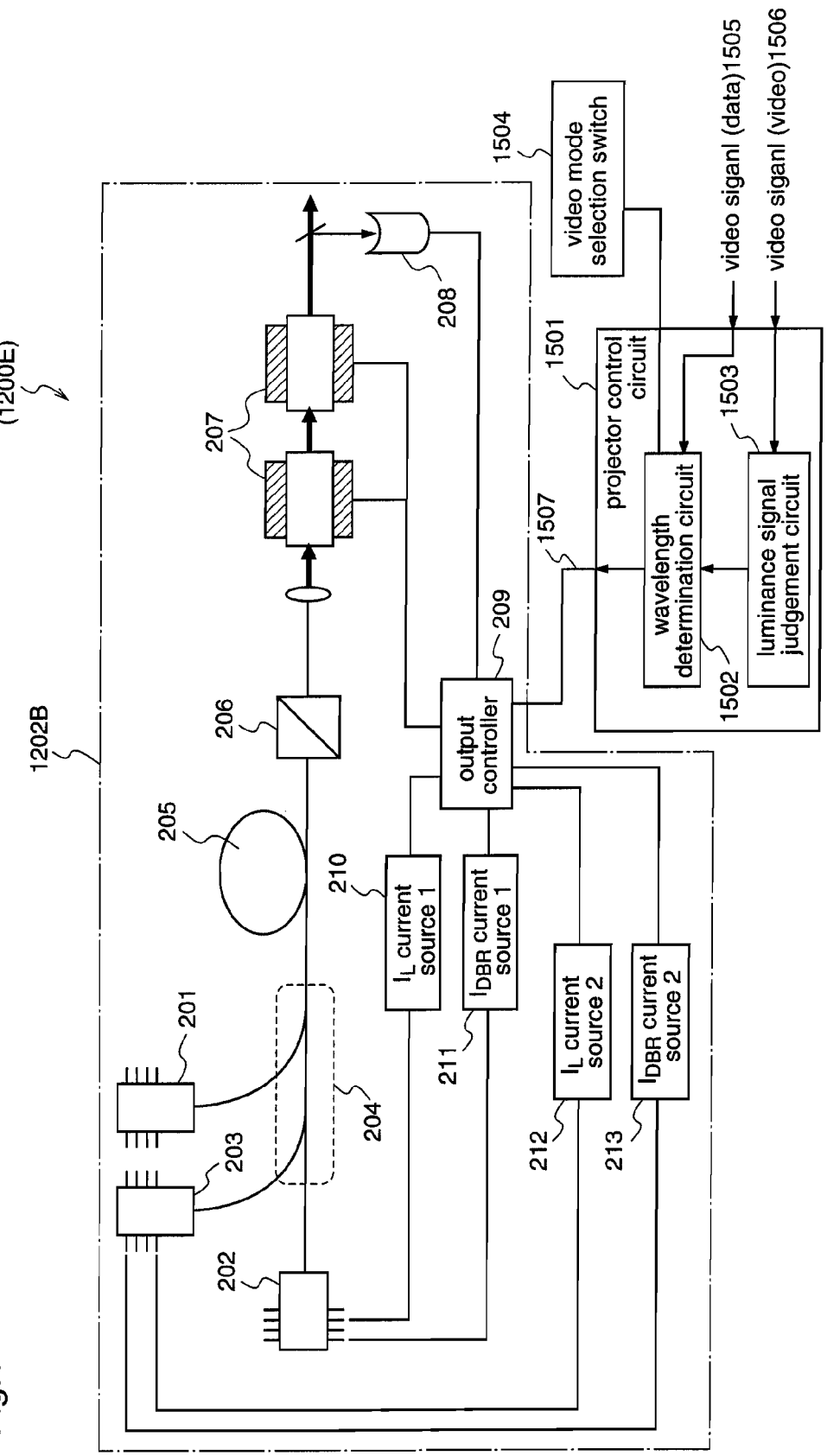
FIG. 12 is a schematic configuration diagram illustrating a two-dimensional image display device according to a fourth embodiment of the present invention.

FIG. 12 shows a portion of the two-dimensional image display device 1200E according to the fourth embodiment, wherein the green light source 1202B shown in FIG. 3 is provided with a projector control circuit 1501 and a video mode selection switch 1504, in order to vary the oscillation wavelength of the laser light according to the video type or the usage condition. Since the construction of the green light source 1202B is identical to that shown in FIG. 3, repeated description is not necessary.

In FIG. 12, the projector control circuit 1501 comprises a wavelength determination circuit 1502 which outputs a wavelength selection signal for selecting a wavelength according to an inputted video signal, and a luminance signal judgment circuit 1503 for analyzing a luminance signal in the inputted video.

An externally inputted video signal (data) 1505 or video signal (video) 1506 is input to the projector control circuit 1501, and a wavelength selection signal is outputted from the projector control circuit 1501 to the output controller 209 through a wavelength selection signal line 1507. Then, an oscillation wavelength of the laser light is selected by the wavelength selection signal.

Next, the operation of the two-dimensional image display device 1200E according to the fourth embodiment will be described.

A description will be given of a case where an external signal varies its oscillation wavelength according to a terminal to which it is applied, such as D-sub15pinDVI, RCA pin, S terminal, D terminal, HDMI terminal or the like.

Initially, when a video signal is input from a D-sub15pin·DVI, i.e., when a video signal (data) 1505 is input to the projector control circuit 1501, since this video signal is a data signal the brightness of which is considered as important, such as video used for presentation, a wavelength selection signal is transmitted from the wavelength determination circuit 1502 through the wavelength selection signal line 1507 to the output controller 209 so as to select green light of a wavelength having a high luminosity factor. When a video signal is input from a terminal such as an RCA pin, an S terminal, a D terminal, or an HDMI terminal, i.e., when a video signal (video) 1506 is input to the projector control circuit 1501, the brightness of the video source is judged by the luminance signal judgment circuit 1503. The luminance signal judgment circuit 1503 analyzes a luminance signal in the video to judge whether the input video signal is a video signal which has many bright scenes like a common TV program (e.g., a studio-recorded program) and therefore the color of which is not important very much, or a video signal which has many dark scenes like a movie and is required to have a broad color expression range. In the former case, the rate of using the green light wavelength having a relatively high luminosity factor is increased to improve the efficiency of power consumption. In the latter case, the rate of using the green light wavelength having a relatively short wavelength such as 526 nm with which the color reproducibility can be extended, thereby to improve the image quality. By the analysis of the luminance signal with the luminance signal judgment circuit 1503, a wavelength selection signal according to the luminance is outputted from the wavelength determination circuit 1502 to the output controller 209.

Thereafter, the operation of outputting the green laser from the green light source 1202B including the operation of the output controller 209 to which the wavelength selection signal is input, and the operation of forming a color image in the two-dimensional image display device 1200E and projecting the image on the screen, are identical to those already described for the second embodiment.

While in this fourth embodiment a wavelength to be used is selected according to an inputted video signal, a user may arbitrarily determine which wavelength is to be used, with the video mode selection switch 1204. For example, when the user prefers a bright image, he/she can designate a green light wavelength having a high luminosity factor. When the user wants to continuously see a high-definition image with a broad color reproducibility, he/she can designate a wavelength the color reproducibility of which can be increased. Further, the user can arbitrarily determine the rate of the oscillation wavelength in the wavelength selection signal that is determined by the luminance signal judgment circuit 1203.

Further, since either the wavelength of 526 nm or the wavelength of 540 nm can be arbitrarily oscillated in the two-dimensional image display device 1200E according to the fourth embodiment, when the device 1200E is used as a data projector for which brightness is required more than color reproducibility, the brightness sensed by the human eye can be increased with the same power consumption by increasing the emission ratio of 540 nm having a relatively high luminosity factor. On the other hand, when color reproducibility of such as a movie is required more than brightness, the color reproducibility can be enhanced by increasing the emission ratio of 526 nm which has a relatively low luminosity factor but can extend the reproducible color range.

Figure 14:
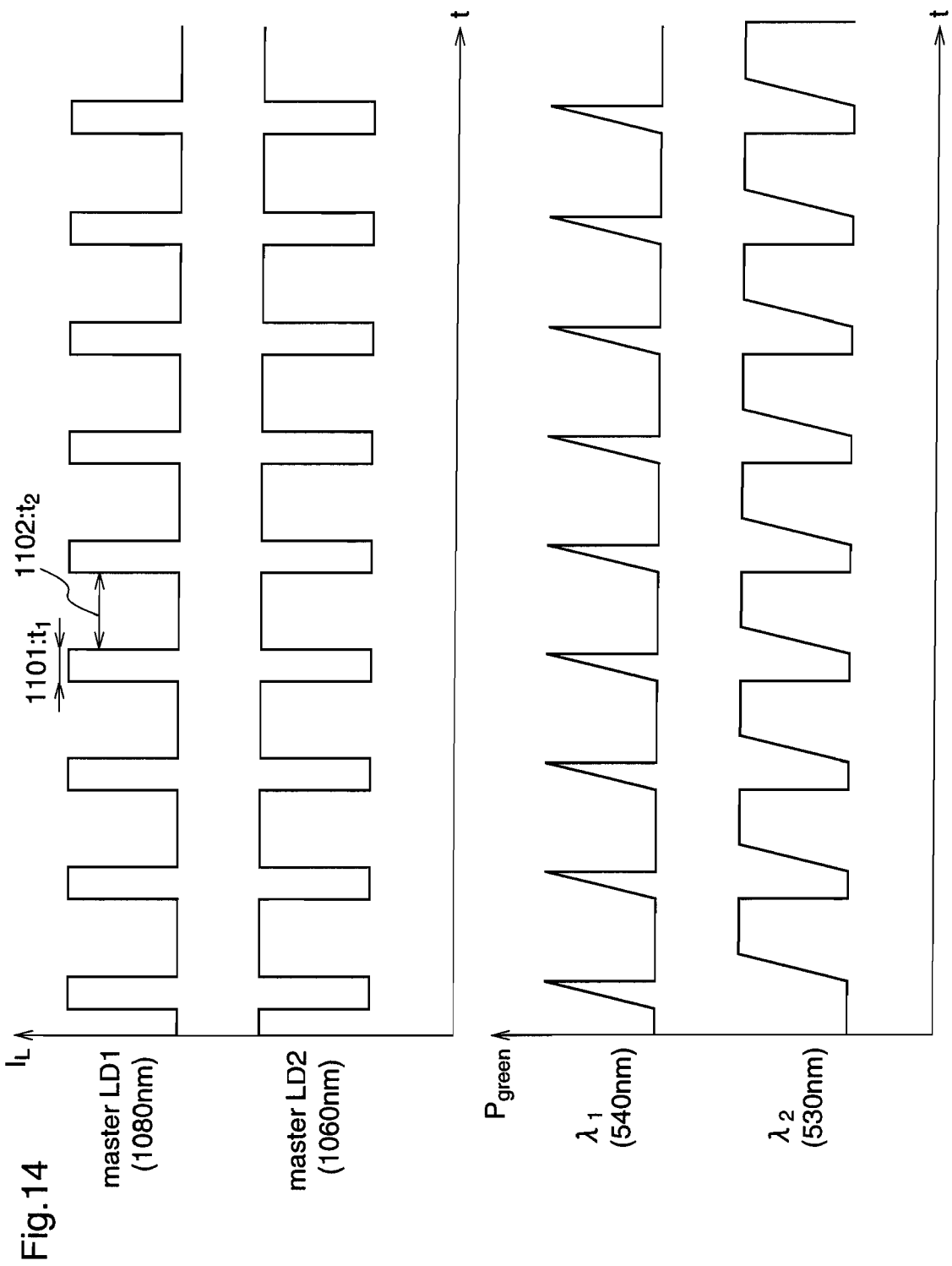
FIG. 14 is a plot diagram illustrating the relationship between the master LD current waveform and the green light output in the case where the light emission rate is varied.

As a method for varying the emission ratio of lasers, the duty ratio of the emission times of the respective lasers may be changed. FIG. 14 shows the applied current waveforms of the master light source 1 (202) and the master light source 2 (203) and the output waveforms of the green lights having the respective wavelengths, in the case where the duty ratio of the emission times is varied. As shown in FIG. 14, the emission times of the respective wavelengths can be varied by varying the duty ratio of the current waveforms (the ratio between time 1101:$t_1$ and time 1102:$t_2$).

Alternatively, there is a method of varying the number of emission pulses per unit time, for example, a method of changing the wavelength for every 10 shots while generating a million shots per second, or generating 10 shots of 526 nm and 20 shots of 540 nm alternately.

Further, in the construction where the light sources of the respective colors are successively turned on to display video by using a micromirror device or a reflection type liquid crystal element, the light sources may be turned on in order of red, blue, green (526 nm), green (540 nm) instead of successively turning on the light sources in order of red, blue, green, with the same effects as mentioned above.

The method for varying the emission ratio is not restricted to those mentioned above, and other methods may be adopted with the same effects as mentioned above.

As described above, in the two-dimensional image display device 1200E according to the fourth embodiment, the green light source 1202B is provided with the projector control circuit 1201 for varying the duty ratio of the plural oscillation wavelengths according to the inputted video signal, and the rate of using the wavelength having a high luminosity factor is increased when the video signal is data, while the rate of using the wavelength that can extend the color reproducibility is increased when the video signal is video. Therefore, speckle noise can be reduced, and the efficiency of power consumption can be enhanced by increasing the rate of using the green light wavelength having a high luminosity factor, or the image quality can be enhanced by increasing the rate of using the green light wavelength having a high color reproducibility, according to the video.

While in this fourth embodiment the green light source 1202B in the two-dimensional image display device according to the second embodiment is adopted, any of the green light sources 1202A, 1202C, 1202C$_2$, and 1202D in the two-dimensional image display devices according to the first and third embodiments may be adopted with the same effects as mentioned above.

Further, while in this fourth embodiment the duty ratio of the laser outputs from the two master light sources is varied according to the video signal, the present invention is not restricted thereto, and the center wavelengths of the master light sources may be varied according to the video signal as shown in FIG. 2(*b*) or 4(*c*).

Further, the two-dimensional image display devices using the light sources according to the respective embodiments mentioned above are merely examples, and other embodiments are also adoptable.

While in the first to fourth embodiments the Yb-doped clad pump fiber 103, 205, 603, 803, or 903 is adopted as a rare-earth-doped fiber, the Yb-doped clad pump fiber 103, 205, 603, 803, or 903 is desired to be a double clad fiber having a polarized wave holding function such as PANDA.

APPLICABILITY IN INDUSTRY

In the above-mentioned image display device using the wavelength controllable laser light source, speckle noise can be effectively reduced. Further, it is possible to generate a wavelength having a high luminosity factor when brightness is required, and generate an optimum wavelength for representing color when color representation is considered as important. In addition, it is possible to obtain additional effects such as that the output can be stabilized by controlling the wavelength of seed light, or the temperature/stress of the gratings from power variation monitored by an output monitor.

The invention claimed is:

1. A light source for an image display device, said light source comprising:
    a rare-earth-doped fiber as a laser activating substance;
    an excitation light source for exciting the rare-earth-doped fiber;
    a plural-wavelength oscillation mechanism comprising:
        a plurality of master semiconductor lasers, each master semiconductor laser producing a different wavelength of laser light than the other master semiconductor lasers of the plurality of master semiconductor lasers, and
        a controller for alternately oscillating the plurality of master semiconductor lasers; and
    a wavelength conversion mechanism for converting the respective wavelengths of the laser lights produced by the plurality of master semiconductor lasers into shorter wavelengths.

2. The light source as defined in claim 1 wherein a rare earth that is doped into the rare-earth-doped fiber is Yb (ytterbium).

3. The light source as defined in claim 1 further comprising:
    an output monitor mechanism for monitoring a light output after the wavelength conversion by the wavelength conversion mechanism,
    wherein the controller is further operable to control the output or wavelength of each of the master semiconductor lasers individually based on an output value from the output monitor mechanism.

4. The light source as defined in claim 1 wherein the wavelength conversion mechanism converts the respective wavelengths of the laser lights into light having a wavelength within a range from 450 nm to 550 nm.

5. The light source as defined in claim 1 wherein the oscillation wavelength of light output by said light source is changeable within a range from 0.1 nm to 25 nm.

6. The light source as defined in claim 1 wherein a ratio of times at which the plural semiconductor lasers are oscillated by the controller is variable.

7. The light source as defined in claim 6 further comprising a projector control circuit for varying a duty ratio between a wavelength having a high luminosity factor and a wavelength having a high color reproducibility, of the light source, according to an inputted video signal.

8. The light source as defined in claim 1 further comprising a speckle noise removal mechanism comprising any of a diffusion plate, a lenticular lens, a hologram element, and a rod prism.

* * * * *